United States Patent [19]
Elluin et al.

[11] Patent Number: 5,402,844
[45] Date of Patent: Apr. 4, 1995

[54] AIR CONDITIONING APPARATUS

[75] Inventors: Patrice Elluin, Paris; Philippe Cardon, La Boissiere Ecole; Georges Haffner, Boulogne/Billancourt, all of France

[73] Assignee: Carrier Corporation, Syracuse, N.Y.

[21] Appl. No.: 38,444

[22] Filed: Mar. 29, 1993

[30] Foreign Application Priority Data

Mar. 30, 1992 [FR] France ................ 92 03832

[51] Int. Cl.⁶ .................. F28D 17/00; F25B 7/00
[52] U.S. Cl. .................... 165/10; 165/18; 62/238.6; 62/59
[58] Field of Search ............ 165/18, 10; 62/238.6, 62/59

[56] References Cited

U.S. PATENT DOCUMENTS

| | | |
|---|---|---|
| 1,954,455 | 1/1934 | Morse et al. . |
| 4,037,650 | 7/1977 | Randall ............... 165/18 |
| 4,796,439 | 1/1989 | Yamada et al. ........... 62/238.6 |
| 5,038,850 | 8/1991 | Choi ................... 165/18 |

FOREIGN PATENT DOCUMENTS

| | | |
|---|---|---|
| 0302768 | 2/1989 | European Pat. Off. . |
| 0454181 | 10/1991 | European Pat. Off. . |
| 9203831 | of 0000 | France . |

OTHER PUBLICATIONS

Search report French INPI on patent application dated 20 Dec. 1992 (in the French language).

*Primary Examiner*—A. Michael Chambers

[57] ABSTRACT

An air conditioning apparatus intended to serve several rooms and having for this purpose a number of individual air conditioning modules. Each air conditioning module (5) serves a single room and has an ice storage reservoir (69) and refrigeration means (53) for making ice, as well as heat transfer means (36, 49 and 71 to 78) to effect heat exchange between the air and the ice.

26 Claims, 11 Drawing Sheets

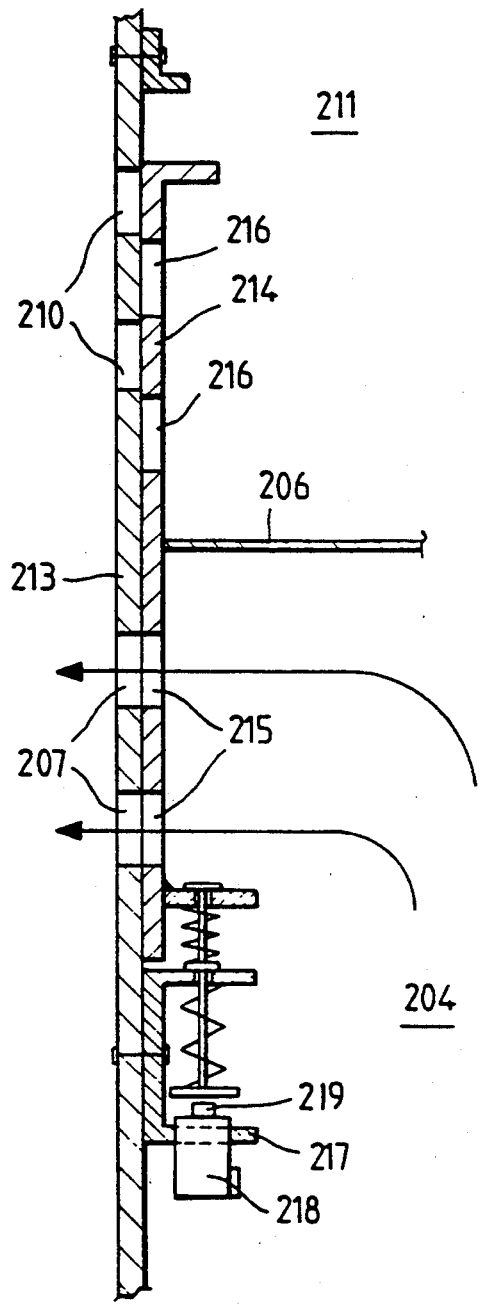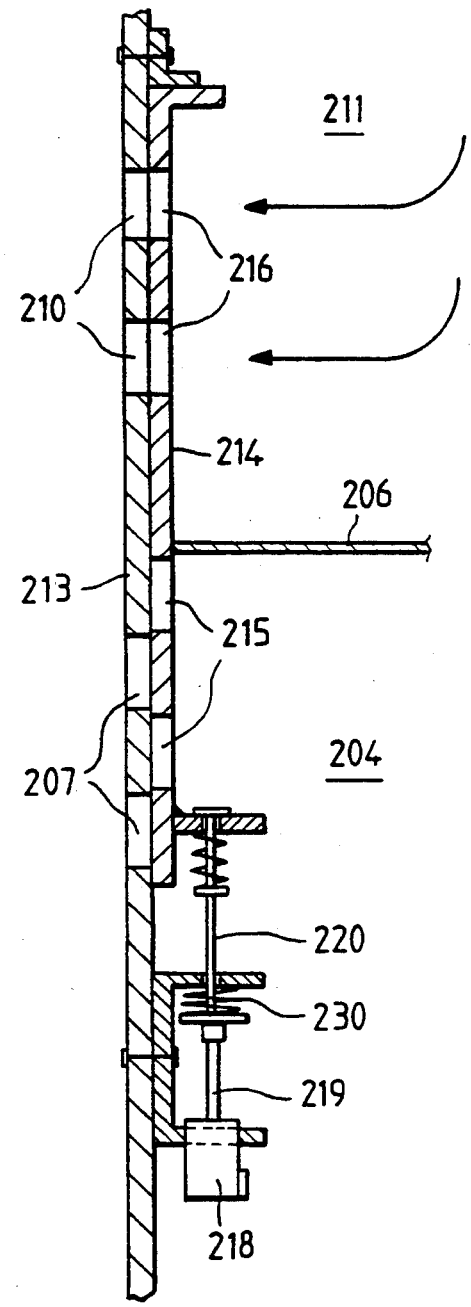
FIG. 12                    FIG. 13

AIR CONDITIONING APPARATUS

BACKGROUND OF THE INVENTION

The present invention relates to air conditioning apparatus intended to ventilate and air condition several rooms. The apparatus has, for this purpose, a number of air conditioning modules housed inside a mechanical room, with each module having:
- a connector to join the module with an air exhaust duct connected to a room;
- a connector to join the module with an air supply duct connected to the room;
- an internal air flow path between the air exhaust and air supply connectors;
- means for ventilating and air conditioning the air that passes through the internal air flow path including means for exchanging heat between the air and a cooling medium;
- means for connecting the apparatus to a source of power; and
- means for controlling the operation of the apparatus.

Such an installation is described in European Patent No. EP-B 302,768 (the '768 patent), which also describes air conditioning modules that are particularly well adapted to construction of an installation including such modules in that they are respectively defined on the exterior by two plane lateral sides that are parallel to each other, by means of which the modules can be positioned next to each other, and by peripheral sides that connect the lateral sides to each other and group together air supply and exhaust connections, connections to a power supply, possibly the controller means and means to gain access to the air conditioning and, optionally, to the controller means or more generally to all of components that may have to be worked upon during normal maintenance. The installation can also require minimum space because of the positioning of the modules next to each other, without causing any impediment to normal maintenance. The peripheral sides of the modules also preferably comprise support means that allow the removal or replacement of one module within a row of modules without having to move the other modules of the row, permitting easy and rapid replacement of a malfunctioning module without dismantling the other modules or interrupting their operation.

To cool the air from a room, possibly with some outdoor air introduced, before returning it to the room, there are means, included in each module, through which the air flow path passes internal to the module, for effecting a transfer of heat between the air and a cooling medium, such means being a heat exchanger for heat transfer between the air and cold water supplied by a common source to the different modules. In practice, this cooling heat exchanger in each module is connected, through partially flexible pipes and electrically operated valves controlled by respective controllers, to a cold water inlet header and a cold water outlet header, both shared by the different modules and leading to a common installation for the production of cold water.

The presence of these tubes, electrically operated valves and cold water inlet and return headers complicates installation and constitutes a source of malfunction that, when they affect the cold water source or the cold water inlet and return headers, for example, in the form of leaks, adversely affect the operation of the entire group of modules. In addition, the distance traveled by this cold water between the cold water source and the cooling heat exchanger of each module can be relatively large giving rise to the loss of cooling capacity even when the cold water inlet and return headers, as well as the pipes that connect them to the cooling heat exchanger, are properly insulated.

SUMMARY OF THE INVENTION

The object of the present invention is to correct these drawbacks. For this purpose, the present invention proposes an apparatus of the type indicated above, characterized in that the cooling medium is freezable water and in that each module has means for storing freezable water and means for freezing the water, controlled by a regulating controller.

Thus, it becomes possible to eliminate the cold water inlet and return headers along with the connecting pipes between the cooling heat exchanger and the former as well as the common cold water source, that is, it is possible to simplify an air conditioning apparatus, considered in its totality, to reduce the risk of leaks and to limit the consequences of a possible leak to the single module concerned and that module may be shut down for repair or replacement. In addition, it is possible to reduce considerably the length of the flow path of the refrigerated medium with which the air exchanges heat inside each module, to isolate this flow path as much as possible and to contain as much as possible of it in the respective module, permitting a considerable improvement in the energy efficiency of the apparatus.

In addition, even if it is true that each module has a larger volume than a module such as is described in the '768 patent, an apparatus in accordance with the present invention can require, because of the elimination of the cold water source equipment shared by the different modules, less floor space than that of an apparatus made in accordance with the teachings of the '768 patent.

Indeed, it is possible to achieve, for each module, a floor space requirement that is essentially equivalent to, with only its vertical space requirement being increased, and corresponding approximately to that of the combination of an air conditioning module of the type described in the '768 patent and the associated means for storing freezable water as well as the means for freezing it.

Advantageously, one also maintains the ability to position next to each other the modules serving several rooms in a mechanical room, by manufacturing each module to have:
- an air exhaust connector;
- an air supply connector;
- an internal air flow path between and connecting the air exhaust and air supply connectors;
- ventilation devices and air conditioning means through which the internal air flow path passes notably including means for exchanging heat between the air and a cooling medium;
- means for connecting the apparatus to a source of power; and
- means for controlling the operation of the apparatus.

Each module should be defined on its exterior by two plane, parallel lateral sides and by peripheral sides that connect the lateral sides to each other and group together the air supply and exhaust connectors, the means for connecting to a power source, possibly the controller means, the means for gaining access to the apparatus and, possibly, to the controller means, as described in the '768 patent. The apparatus is, in addition, characterized in that the cooling medium is water and in that the module comprises, between its lateral sides or coplanar geometrical extensions of them, means for storing freezable water and means for freezing the water, regulated by the controller means.

Thus, the floor space requirement of an installation manufactured in accordance with the present invention can be in all regards comparable to that of the air conditioning modules in an apparatus manufactured in accordance with the teachings of the '768 patent, corresponding to, in terms of space requirements, a space savings equal to the space requirement for the cold water source apparatus necessary for the operation of the air conditioning apparatus described in the '768 patent.

Note that, like the air conditioning modules described in the '768 patent, the modules of the present invention can not only be arrayed next to each other in any number, while retaining the capability to gain access to all of the components that must be accessible for normal maintenance but also they can be positioned, especially in a single installation, next to a partition or a wall, for example, inside a closet or any recess to ensure the in situ ventilation and air conditioning of a single room, while maintaining access capability even when the closet or recess that holds them is small.

Another advantage of the air conditioning apparatus and the module of the present invention resides in the ability to restrict the requirement for energy to electrical energy only, considerably simplifying connection to power or energy sources, which then are only electric, thus giving great flexibility to install several modules in a mechanical room or a single module in a closet or any recess. Indeed, the freezing means can advantageously be electric and the connection to the power source can consequently be an electrical connection. The same holds when each module also has heating means included in its internal flow path and controlled by its controller. The heating means can be electrical, in which case it is connected to an electrical power supply by an electrical connection, or may be a water-to-air heating heat exchanger included in its internal flow path and controlled by its controller and connected to a source of hot water that is specific to the module under consideration, although possibly located external to it in which case the module has means for connecting the heating heat exchanger to the external source of hot water located between its front sides or the coplanar geometrical extensions of them.

The freezing means specific to each module advantageously includes a refrigeration apparatus, itself including a refrigerant evaporator and means for transferring heat between a cooling medium, such as freezable water according to the present invention, and the refrigerant in the evaporator, as well as a refrigerant condenser and means for circulating a cooling fluid in direct heat exchange relationship with the refrigerant in the condenser.

These circulating means can be advantageously shared by several modules, with each then comprising means for connecting the condenser to an external cooling fluid circulating means, between the lateral sides or the coplanar geometrical extensions of them, to remove, by means of the same circulating cooling fluid the heat produced by the various condensers.

The circulating means can include means for transferring this energy from the cooling fluid to the outside atmosphere in which case it can include, for example, a flow path for exhausting stale air that opens into the atmosphere as is generally provided in air conditioned buildings.

However, one can also provide the circulating means with means for recovering energy from the cooling fluid for use for heating.

Thus, the circulating means can include a flow path for conditioned air, in which case each module is also provided with means for directly transferring heat with this conditioned air included in the internal air flow path of the conditioned air and controlled by the respective controller. The conditioned air, raised in temperature as a result of direct heat exchange with the refrigerant in the condenser, is used to heat the air passing through the internal air flow path of the module.

The circulating means can also include a hot water flow path for service hot water or heating purposes or include means for directly exchanging heat between the cooling fluid and the water of such a flow path for service hot water or heating purposes. In the two cases, the hot water flow path is advantageously shared by several modules, that is, by all the modules located in the same mechanical room. It can include means for supplemental heating.

Such production of hot water by recovering energy in the condensers of the refrigeration apparatus of the different modules results in the need for an exclusively electrical energy supply for each module even when each module includes a heat exchanger for direct heat transfer between the air and the hot water interposed in the respective internal air flow path, since this heat exchanger can be connected to the above described hot water system and can be regulated by the respective controller, with the hot water being produced in this manner being used as a heating fluid for air passing through the internal flow path of the module. Naturally, to the extent that the need for cooling the air and for heating air are not simultaneous, the hot water system advantageously comprises a tank for storing hot water, which is also preferably the case regardless of whether the hot water produced by the recovery of heat from the condensers is used for service or heating purposes.

Naturally, when the hot water flow loop is external to the modules and, in particular, when it is shared, each module preferably includes between its lateral sides or coplanar geometrical extensions of them, means for connecting the air-to-hot water heat exchanger to this external hot water loop.

Whether the energy released in the condensers of the refrigeration apparatus corresponding to the different modules is released into the atmosphere or recovered to heat air or water, the method of freezing the freezable water used as a cooling medium can be selected from a broad range of possibilities by one skilled in the art.

Thus, the means for exchanging heat between the cooling medium (freezable water) and the refrigerant in each module can be the means for directly exchanging heat with the evaporator of the respective refrigeration apparatus placed in direct heat exchange relationship with the refrigerated medium (freezable water) in the storage reservoir.

However, the means can also be indirect and can comprise a flow loop of heat transfer fluid including means for first directly transferring heat between the heat transfer fluid and the refrigerant in the evaporator and then between the heat transfer fluid and the refrigerated medium (freezable water) in the storage reservoir.

Regardless of the means thus selected to freeze the freezable water used as the refrigerated medium in each module, the heat exchange means between the air and the refrigerated medium, that is, the freezable water, at each module can also be selected from a broad range of options and, notably, can include either indirect or direct heat transfer means.

Indirect means for heat transfer between the air and the refrigerated medium (freezable water) can include, at each module, a heat transfer fluid flow loop including means for direct heat transfer between the heat transfer fluid and the refrigerated medium (freezable water) in the storage reservoir, on the one hand, and between the heat transfer fluid and the air in the internal flow path, on the other hand.

Such a selection of heat exchange means between the air and the refrigerated medium (freezable water) can be combined with that of the means for exchanging heat, also indirect, between the refrigerated medium (freezable water) and the refrigerant, in which case each module can include, in a very simple manner, a single flow loop of heat transfer fluid including the means for directly exchanging heat between the single heat transfer fluid and:
  the refrigerant in the evaporator;
  the refrigerated medium (freezable water) in the storage reservoir; and
  the air flowing through the internal flow path.

However, one can also ensure, when deciding to equip each module with means for indirectly exchanging heat between the refrigerated medium (freezable water) and the refrigerant, as well as between the air and the refrigerated medium (freezable water), that each module has two distinct heat transfer fluid flow paths, one path including means for directly exchanging heat between the heat transfer fluid and the refrigerant in the evaporator, with the other flow path including means for directly exchanging heat between the heat transfer fluid and the air in the internal air flow path and both flow paths forming in common means for directly exchanging heat between the heat transfer fluid and the refrigerated medium (freezable water) in the storage reservoir.

Selection of the latter configuration allows the dissociation of the circulation of heat transfer fluid so that both a transfer of cooling capacity from the refrigerating fluid to the refrigerated medium (freezable water) is ensured and also so that such a transfer of heat from the refrigerated medium to the air is ensured in the internal air flow path, under the urging of mechanical means that is appropriate to the nature of the heat transfer fluid, such as a pump when the fluid is liquid or a fan when it is a gas.

Indeed, one can use different fluids as heat transfer media and, notably, the heat transfer fluid can be a liquid or air.

When the means for exchanging heat between the air and the refrigerated medium (freezable water) are no longer indirect means, but direct heat exchange means, air in the internal flow path is placed in direct heat exchange relationship with the refrigerated medium (freezable water) in the storage reservoir, which can give rise to particularly simple embodiments of each module:

In particular, one can provide means for heat exchange between the refrigerated medium (freezable water) and the refrigerant, means that are indirect and include a flow loop of heat transfer fluid that is a portion of the internal air flow path and including means for direct heat exchange between the heat transfer fluid, being air, and the refrigerant in the evaporator, on the one hand, and between the air used as a heat transfer fluid and the refrigerated medium (freezable water) in the storage reservoir, on the other hand, by also providing means for temporarily closing the part of the internal air flow path on itself by isolating the air suction and air exhaust connectors in a manner controlled by the controller in order to alternate periods of freezing the freezable water used as the refrigerated medium with periods of heat exchange between the refrigerated medium thus formed and the air drawn from a room and to be returned to the room.

Preferably, as is known in itself and regardless of the manner in which the exchange of heat exchange is effected between the air drawn from the room to be then returned and the refrigerated medium of freezable water, the air, before this exchange of heat, has fresh air added. For example, in accordance with the teachings of the '768 patent, the apparatus for this purpose includes means for supplying fresh air to the internal air flow path of the air conditioning modules, with each module having means for connecting its internal air flow path to the fresh air supply means located between its lateral sides or coplanar extensions of them.

The air conditioning apparatus and module according to the present invention can also present all the dispositions described in the '768 patent. In particular, the air conditioning modules in a given installation are advantageously identical and positioned next to each other with their lateral sides in a position in which the latter are vertical, and supported by means that are preferably located at the level of their peripheral sides, allowing their removal from the row of modules or their insertion in such a row exclusively by movements parallel to their lateral sides. Such an arrangement is also advantageous when a module is used individually, as in a closet or any recess, to the extent that any installation or removal operations are facilitated as a result, allowing the installation of a module in a small space.

Other characteristics and advantages will become apparent following the below description of several nonlimiting embodiments, as well as the attached drawings, that are an integral part of this disclosure.

BRIEF DESCRIPTION OF THE DRAWINGS

FIGS. 12 and 13 illustrate the respective configuration of a sliding register that guides the passage of air to be conditioned into the module of FIGS. 11.

DESCRIPTION OF THE PREFERRED EMBODIMENTS

Figure 1:
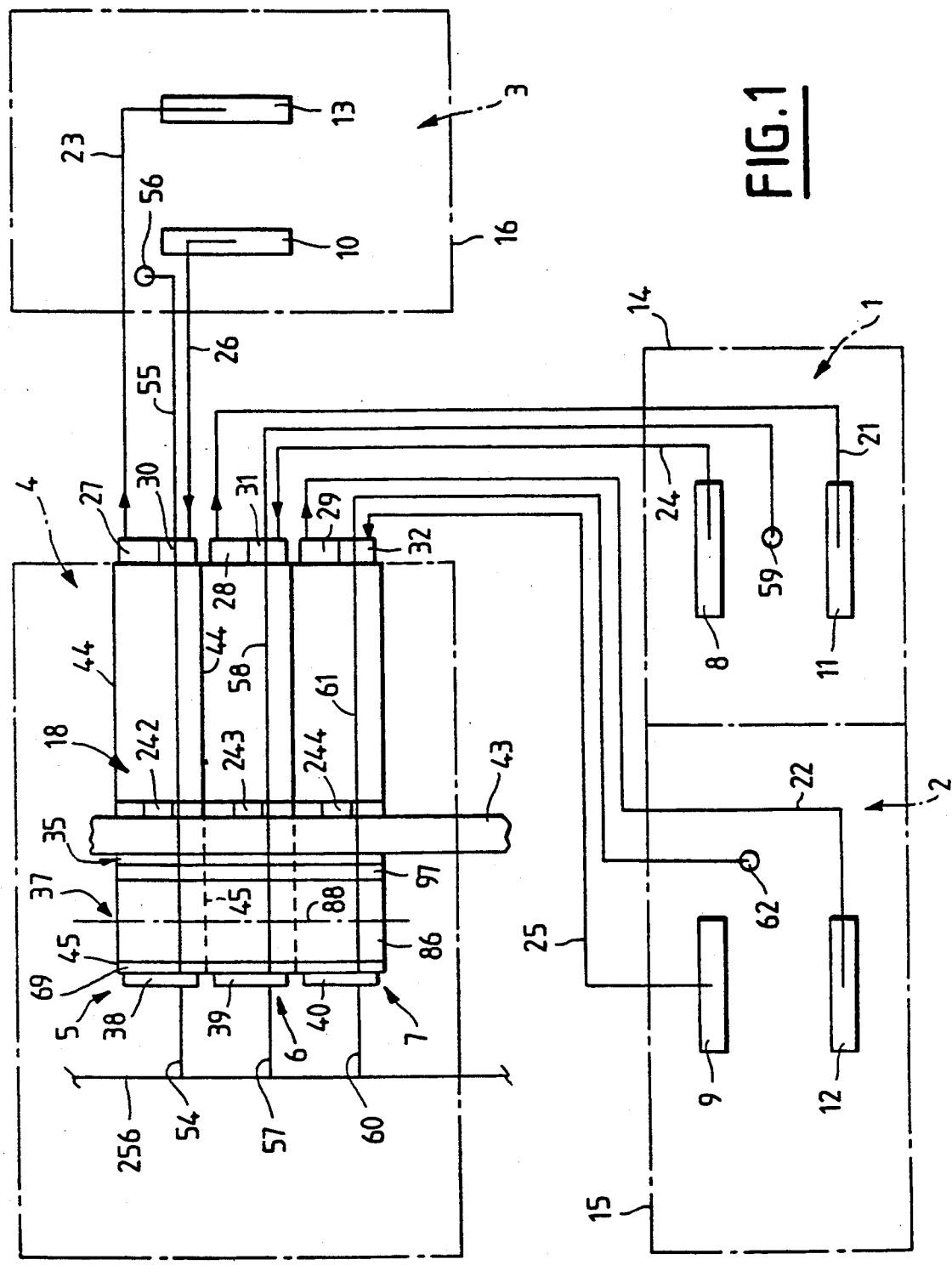
FIG. 1 is a schematic diagram of an air conditioning system according to the present invention.

Referring first to FIG. 1, that drawing is a schematic representation of three rooms 1, 2 and 3 to be ventilated and air conditioned and mechanical room 4 containing air conditioning modules 5, 6 and 7, preferably all identical and each respectively associated with one of the three rooms 1, 2, and 3 and positioned next to each other in a row. Naturally, this example is not limiting for the number of rooms that can be air conditioned from the same mechanical room, that is, the number of air conditioning modules located in this mechanical room will, in general, be more than three, with a single mechanical room being, for example, provided to contain the air conditioning modules corresponding to all the rooms on the same floor of a building. However, the below description of the air conditioning modules according to the invention will show that these modules can also be used singly or in pairs, housed in a recess such as a closet, directly adjacent one or possibly two rooms to be air conditioned, with an air conditioning module according to the invention not requiring any energy input beside electrical power, a source easily provided to any place.

Each of rooms 1, 2 and 3 has, advantageously integrated with a false ceiling, at least one air exhaust terminal 8, 9 and 10 and at least one air supply terminal 11, 12 and 13, whose selection and optimum relative arrangement are within the normal abilities of one skilled in the art. Preferably, when a room such as one or more of rooms 1, 2, or 3 has a window 4, 15 or 16, its air supply terminal 1, 12 or 13 is located between its air exhaust terminal 8, 9 or 10 and its window 14, 15 or 16, and the supply terminal is of a type that has thermostatically controlled means for directing the flow of the supply air and which means is controlled by the temperature of the supply air, for example, of the type manufactured and marketed in France under the trade name "Optimix" by the company Carrier S.A., an affiliated company of Carrier Corporation, in Paris. Of course, other types of air supply terminals, using other means for distributing the supply air as a function of air temperature to each room could be selected without leaving the scope of the present invention.

For each of air supply terminals 11, 12 and 13, there is a corresponding air supply duct 21, 22 and 23 and, similarly, for each of air exhaust terminals 8, 9 and 10 there is a corresponding air exhaust duct 24, 25 and 26. These different ducts are preferably housed in a shoe between the false ceiling and the ceiling slab, in a manner not shown but known to one skilled in the art.

Advantageously, all the different supply and exhaust ducts 21, 22, 23, 24, 25 and 26 have uniform cross sections and are, among themselves, identical. The ducts can be flexible and each of them can thus extend continuously, without intermediate joints, from the room where the respectively associated air supply or exhaust terminal is located to mechanical room 4.

Inside mechanical room 4, each air supply duct 21, 23 and 24 is joined to an air supply connection 27, 28 and 29 of the respectively associated air conditioning module 5, 6 and 7 and each air exhaust duct 24, 25 and 26 is joined to an air exhaust connection 30, 31 and 32 of the respectively associated module 5, 6 and 7. There is no intercommunication or mixing of air between the different air supply ducts nor between the different air exhaust ducts in this preferred embodiment of a system according to the invention. This conforms to the '768 patent, but one would not depart from the scope of the present invention if one were to provide an air exhaust or air supply that is shared by several rooms.

Similarly, in this preferred embodiment and in accordance with the teachings of the '768 patent, the air to be conditioned passes, inside each of modules 5, 6 and 7, between the respective air exhaust connection 30, 31 and 32 and the respective air supply connection 27, 28 and 29, through an internal flow path that is independent from one module to the other, that is, there is no mixing between the air streams that pass through the respective internal flow paths of the different modules 5, 6 and 7.

Figure 2:
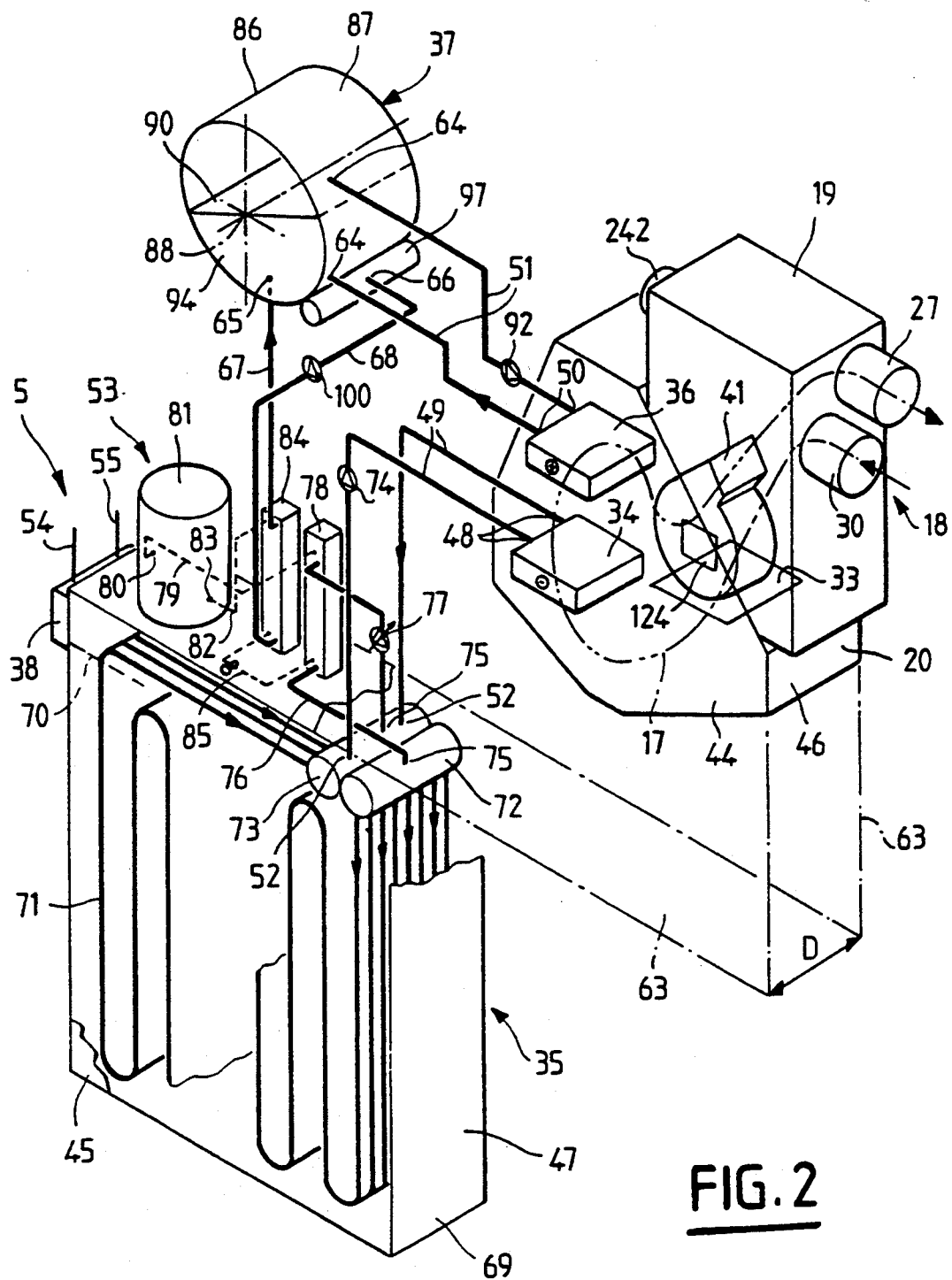
FIG. 2 shows, in a perspective view, partially broken away, a first embodiment of an air conditioning module of this system of the preferred type that can be positioned horizontally next to other modules of the same type, with this module occupying its functional position.

As shown schematically in FIG. 2, with respect to air conditioning module 5, the internal flow path through which the air to be conditioned thus flows, from exhaust connection 30 to air supply connection 27, generally has a U shape, as represented by line 17, inside subassembly 18 of air conditioning module 5.

Subassembly 18 presents numerous analogies with the air conditioning module described with reference to FIG. 9 of the '768 patent, as a variant embodiment of the air conditioning module described with reference to FIGS. 6, 7 and 8 of that same document, to which reference will be made in this regard.

Recall that subassembly thus constitutes the assembly, integrally connected but detachable, of case 18 and air conditioning enclosure 20. Case 18 is linked and suspended, for example, by means of a horizontal rail, not shown, from a part of the ceiling of mechanical room 4 and comprises air exhaust and supply connections 30 and 27. Air conditioning enclosure 20 constitutes, in the case of the '768 patent, the air conditioning module proper and within which there is an internal flow path for air, schematically represented by line 17, from air exhaust connection 30 and passing successively through:

filter 33;

cooling heat exchanger 34, where air flowing through internal flow path 17 exchanges heat with an antifreeze liquid, such as glycolated water, which liquid is lowered to a temperature less than ambient, in the manner of the present invention, by subassembly 35 of module 5, which subassembly 35 advantageously rests on the floor immediately under subassembly 18;

heating heat exchanger 36 where the air passing through internal flow path 17 exchanges heat with a supply of hot water, according to a preferred embodiment of the present invention, through subassembly 37, which itself is partially unique to module 5 and partially shared with the group of modules 5, 6 and 7 located together in the same mechanical room 4, heat exchange of course occurring alternately in cooling heat exchanger 34 and in heating heat exchanger 36, as a function of air conditioning demand, in a manner determined and controlled by variable controller 38, which controls air temperature only preferably, the air output of module 5, and independent of corresponding controllers 39 and 40, respectively, of modules 6 and 7 and preferably supported integrally by one subassembly, notably subassembly 35 of module 5; and fan 41, driven by an electric motor, preferably of the variable speed type, supplied with electrical power by electrical supply line 256 in a manner controlled by controller 38, and returning towards air supply connection 27.

Case 19 also has fresh air inlet connection 242 joined to fresh air supply duct 43, which it shares with modules 6 and 7, each of those modules having similar connections 243 and 244 to allow the mixing of a predetermined but adjustable proportion of fresh air with the air returning from room 3 before conditioning the air in internal flow path 17 and returning it to the room.

Like the air conditioning modules described with reference to FIGS. 6 through 9 of the '768 patent, subassembly 18 has two plane, parallel and vertical lateral sides 44 by which subassemblies, such as subassembly 18 and corresponding subassemblies in other modules, the modules are positioned next to each other. Similarly, subassembly 35 has two plane, parallel and vertical lateral sides 45. Lateral sides 45 are separated from each other by distance D, which distance is equal to the distance that separates lateral sides 44 of subassembly 18 so each of lateral sides 45 can be positioned in coplanar geometric extension 63 of the corresponding lateral side 44 of subassembly 28 of the same module 5, so that subassembly 35 of module 5 and the corresponding subassemblies of modules 6 and 7 can be positioned next to each other by their lateral sides 45.

Between respective lateral sides 44 and 45, subassemblies 18 and 35 have respective peripheral sides 46 and 47 that, as taught by the '768 patent, connect corresponding sides 44 and 45 to each other and also group together:

with respect to subassembly 18, connections 27, 30 and 242, connections 48 for joining antifreeze liquid circulating pipes 49 to cooling heat exchanger 34, connections 50 for joining hot water circulating pipes 51 to heating heat exchanger 36 and suspension means; and with respect to subassembly 35, connections 52 for joining pipes 49, controller 38, means for attaching the assembly to the floor, refrigeration apparatus 53 and means 54 and 55, respectively, for connecting controller 38, power supply line 256, which is shared within the group of modules 5, 6 and 7 located in mechanical room 4, and for linking with remote control means 56 located in room 3, it being understood that similar means of connection and remote control are also provided for modules 6 and 7, those means being denoted, respectively, by reference numbers 57, 58, 59, 69, 61 and 62.

Similarly, between respective coplanar geometrical extensions 63 of lateral sides 44 of subassembly 18 of module 5, subassembly 37 has connections 64 for joining hot water pipes 51 and connections 65 and 66 for joining refrigerant pipes 67 and 68, themselves being connected to refrigeration apparatus 53, as will be described below.

Thus, the capability described in the '768 patent to accomplish routine maintenance operations not only on module 5 but also on the preferably identical modules 6 and 7 without having to separate these modules is achieved, along with the capability to remove one module or one specific subassembly such as subassembly 18 or 35 from a module by movements that are parallel to lateral sides 44 and 45 and without having to move the other modules.

One may refer to the '768 patent for details of the construction of subassembly 18, which can differ from the air conditioning module described with reference to FIG. 9 only in that here there are no electrically operated valves at the connection of pipes 49 and 51 to, respectively to cooling heat exchanger 34 and heating heat exchanger 36.

However, details of the construction of subassembly 35 of the embodiment of the invention illustrated in FIG. 2 will follow below.

In this embodiment, subassembly 35 has, externally, the form of a parallelpiped shaped reservoir bounded by flat walls defining lateral sides 45 and peripheral side 47. Reservoir 69 is watertight, with the exception of vents at the top, not shown, and can contain still, freezable water up to level 70, which level is as high as possible.

Inside reservoir 69, watertight tube array 71, in the form of a coil is immersed in the water so as to be distributed as widely as possible within the reservoir. The array is connected at one end to common inlet header 72 and on the other to common outlet header 73. Headers 72 and 73 are located next to each other inside reservoir 69 in an upper zone of the reservoir, for example, essentially at level 70.

Outlet header 73 has connections 52, described above, for joining with two pipes 49, one of which is equipped with constant speed electric secondary pump 74, supplied with electric power by line 256 and capable of taking a suction of antifreeze liquid, as determined by controller 38, from outlet header 73 and to discharge the fluid through one branch of pipe 49 into cooling heat exchanger 34 from which the antifreeze liquid then returns to outlet header 73 through the other branch of pipe 49.

In addition, both inlet header 72 and outlet header 73 have connections 75, respectively for pipe 76. The section of pipe 76 that connects to outlet header 73 contains variable speed primary electric pump 77 supplied with electric power by line 256 as determined by controller 38, for taking a suction of antifreeze liquid from outlet header 73. Pipe 76 is a component of an antifreeze liquid flow loop that also includes evaporator 78 of refrigeration apparatus 53.

In evaporator 78, which is advantageously housed in the same thermally insulated enclosure as reservoir 69, the antifreeze liquid pumped from outlet header 73 by primary pump 77, before returning to inlet header 72, is placed in direct heat exchange relation with a refrigerant that circulates in a flow loop. That flow loop comprises pipe 79 connecting the evaporator with suction inlet 80 of compressor 81 of refrigeration apparatus 53, which is supplied with electric power from line 256 as determined by controller 38, pipe 82 connecting discharge outlet 83 of compressor 81 and condenser 84 that, while being part of refrigeration apparatus 53, can be carried either by subassembly 35 or by subassembly 37, with which it works in cooperation, as described below, and pipe 85 that serves to relieve pressure and ensures a connection between condenser 84 and evaporator 78.

In condenser 84, the refrigerant is placed in direct heat exchange relationship with a fluid, in practice the fluid being water supplied to the heating heat exchanger as hot water in the preferred and illustrated embodiment, which arrangement allows for the use, for supplying heated water either to supply heating heat exchanger 36 or to a service hot water system, or both, the heat energy produced in condenser 84 when refrigeration apparatus 53 is operating, that is, when it causes, through the action of evaporator 78 and while primary pump 77 is operating, the circulation of cooled antifreeze fluid in tube arrays 71 located within reservoir 69, to freeze the water contained in the reservoir.

Because the demand for hot water in heating heat exchanger 36 and the demand for service hot water are not necessarily equal to the demand for cold fluid to freeze water in reservoir 69, that is, because the demands for hot water do not necessarily occur when refrigeration apparatus 53 is operating, subassembly 37 notably includes hot water tank 86, which is thermally insulated and preferably shared by the group of modules 5, 6 and 7 located in the same mechanical room 4, although one could also provide individual hot water tanks, each respectively associated with a different module.

Figure 6:
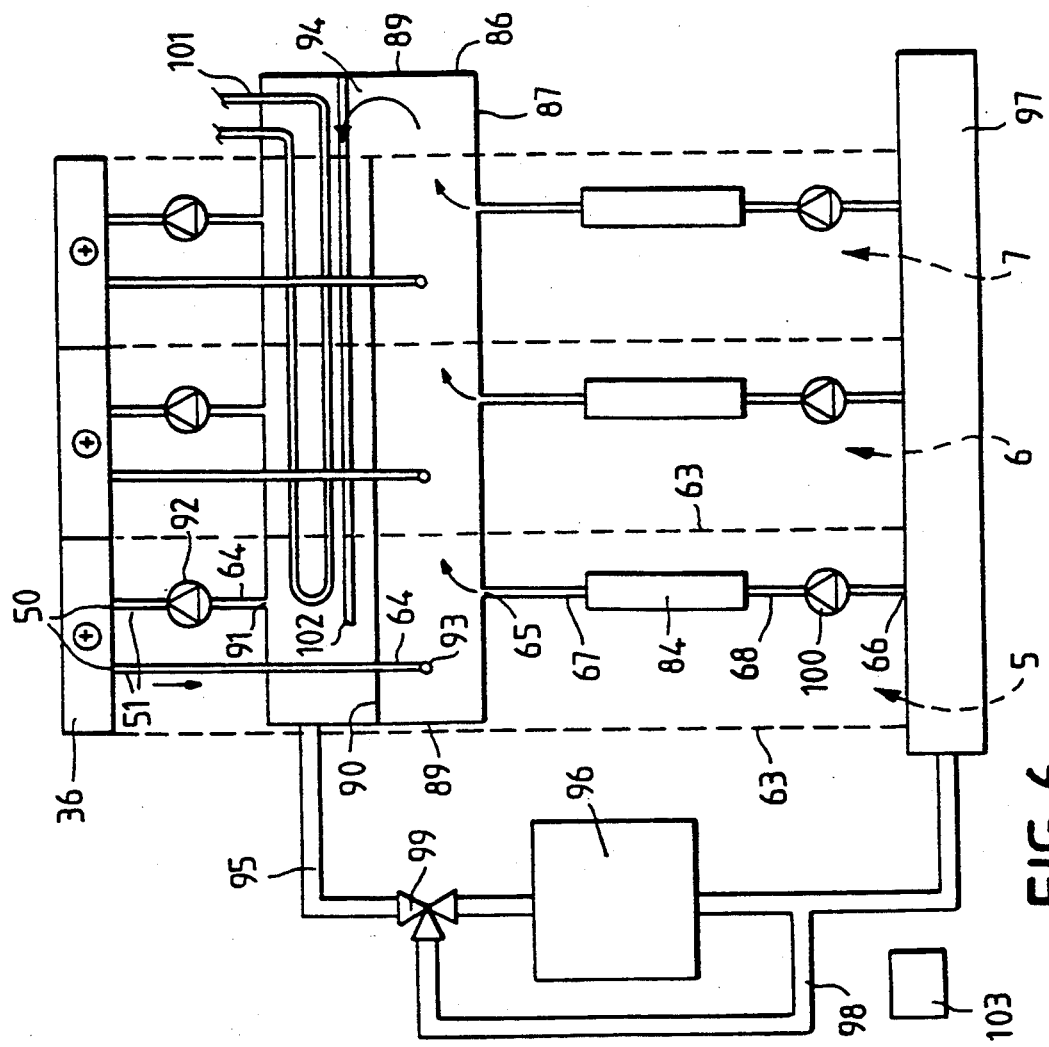
FIG. 6 is a schematic of the means for recovering energy.
Figure 5:
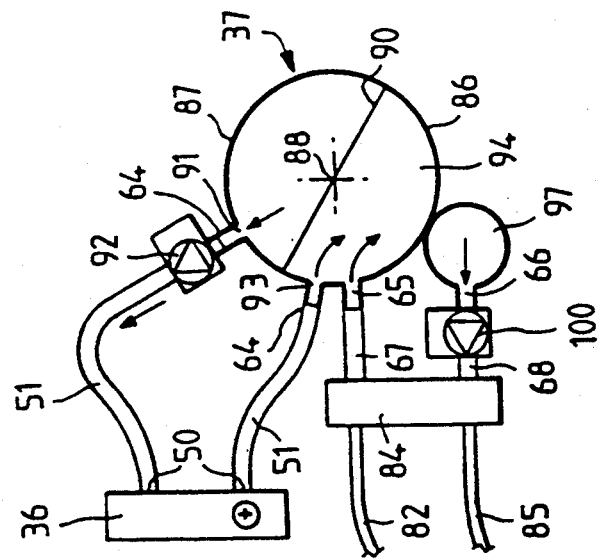
FIG. 5 is a schematic representation, in cross section through a plane perpendicular to the row formed by the positioned modules, of a means for recovering energy used in the system shown in FIG. 1 and simultaneously comprising components specific for each respective module as well as components shared by all the modules of the system.

As is also shown in FIGS. 5 and 6, hot water tank 86, in this case shared by modules 5, 6 and 7, is defined by wall 87 that has a cylindrical shape revolved around horizontal axis 88, which axis is parallel to the row formed by modules 5, 6 and 7, as positioned next to each other, and by two ends 89 that are perpendicular to axis 88. Inside tank 86, baffle 90, a flat watertight wall passing through axis 88 and watertightly joined to one end 94 and, on both sides of axis 88, to wall 87 so as to restrict the possibility of water crossing baffle 90, inside hot water tank 86, in the immediate proximity of the other end 89.

Preferably, as shown more particularly in FIG. 5, baffle 90 is slanted, inside hot water tank 86, so as to descend from its area closest to subassembly 18, to which subassembly 37 is positioned above subassembly 35.

Above and below the highest position of baffle 90 with respect to each module and, for example, for module 5, wall 87 of hot water tank 86 has, between respective coplanar geometrical extensions 63 of lateral sides 44 and 45 of the module, connection 91 for one of two pipes 51, which pipe 51 is equipped with electric pump 92, supplied with electrical power by line 256 as determined by controller 38, so as to draw hot water into tank 87 from heating heat exchanger 36 and connection 93 for the other pipe 51, which returns hot water to heating heat exchanger 36 from hot water tank 87.

The water in hot water tank 87 can thus ensure a supply of hot water to each heating heat exchanger 36.

In addition, in the end 89 of hot water tank 86 to which baffle 90 is adjacent and above baffle 90, pipe 95 opens into hot water tank 86 and carries water to heat exchanger 96, where there can be a transfer of heat between the water conveyed from hot water tank 87 by pipe 95 and a heat transfer fluid to remove the heat contained in the water. This heat transfer fluid can be notably air removed from rooms 1, 2 and 3 for conditioning and replaced in the rooms by fresh air supplied to the various subassemblies 18. This air is then exhausted to the outdoors by a forced air ventilator, not shown, that circulates air in a duct inside which heat exchanger 96 is located. At the outlet of heat exchanger 96, the hot water, with a part of its heat energy removed, is led towards rectilinear header 97, that lies parallel to axis 88 and along hot water tank 87 from one to the other of ends 89 of the tank, between the tank and a subassembly, such as subassembly 18, of each of modules 5, 6 and 7. In parallel with heat exchanger 96, bypass line 98 is provided in pipe 95, through which bypass flow is controlled by electrically operated valve 99. When a flow of hot water from hot water tank 87 to header 97 through pipe 95 is desired but the cooling effect on the hot water by its passage through heat exchanger 96 is not desired, the water can be made to flow directly to header 97 through the bypass.

For each module and notably at module 5, between coplanar geometric extensions 63 of lateral sides 44 and 45, header 97 has joint 66 for connecting to pipe 68, which pipe leads to condenser 84 and is fitted with electric pump 100, which pump is supplied with electric power by line 256 as determined by controller 38, to take a suction on the hot water in header 97 and cause it to flow into condenser 84, where the water is placed in direct heat exchange relationship with the refrigerant that passes through condenser 84 between discharge outlet 83 of compressor 81 and evaporator 78. Pipe 67, ensuring the continued flow of the water after it passes through condenser 84, opens through joint 65 into wall 87 of hot water tank 86, below baffle 90 and between coplanar geometrical extensions 63 of lateral sides 44 and 45 of each module.

Advantageously, one can provide coil 101, which coil is a part of a service water supply and which passes through the interior of hot water tank 86 above baffle 90, in such a manner that this service water is heated by the water in hot water tank 86.

Under these conditions, the operation of module 5 is as follows, with it being understood that modules 6 and 7 operate identically and preferably independently.

When the weather is hot, requiring cooling of the air entering module 5 through connector 30 from room 3 as well as cooling the fresh air entering module 5 through connector 242 and supplying the cooled air through connector 27 to the room, heating heat exchanger 36 is not operated and cooling heat exchanger 34 must be able to cool the air that passes through internal flow path 17 of subassembly 18 of module 5. It is assumed that room 3 is not occupied except during the day, that is, there is a need to cool the air in the room only during the day.

At night, compressor 81 operates and primary pump 77 functions at its maximum speed, so as to cause a circulation of refrigerant in sealed tube arrays 71, which freezes the water inside reservoir 69. Secondary pump 74, in contrast, is stopped. During operation in this mode, condenser pump 100 is operating so that water from tank 86 circulates through pipe 95, header 97, pipe 68, condenser 84 and pipe 67. The water is reheated during its passage through condenser 84. If the temperature of tank 86 increases because of the lack of demand for service hot water and/or hot water for heating, electrically operated valve 99 causes this water, circulating from hot water tank 86 towards header 97, to flow into heat exchanger 96 where this water loses a part of its heat energy. If the opposite situation exists, electrically operated valve 99 causes the water to flow through bypass 98 so that it reaches header 97 at a temperature that is approximately the same as that in hot water tank 86.

During the day, when cooling heat exchanger 34 is operated by controller 38, compressor 81 is stopped and the cooling capacity of cooling heat exchanger 34 is achieved, to the greatest extent possible, by the cooling effect of the ice in reservoir 69. For this purpose, secondary pump 74 operates, generally at a constant speed, to cause the antifreeze liquid to circulate between cooling heat exchanger 34 and header 73. Primary pump 77 operates at a variable rate, regulated by controller 38, so as to cause the antifreeze liquid to circulate inside tube array 71 and to supply, in this manner, header 73 with cooling capacity obtained from the ice stored in reservoir 69. If the temperature that one desires to attain in room 3 by cooling, compared to the ambient temperature, is such that the cooling capacity stored in reservoir 69 is not sufficient, controller 38 will sense this condition because it will determine that it is necessary to operate primary pump 77 at its maximum speed, or because the temperature sensors send an appropriate signal. In this case, compressor 81 is automatically started again to supply cooling capacity both to cooling heat exchanger 34, and, to the extent possible, to again store cooling capacity, in the form of ice, in reservoir 69.

When the weather is hot, the energy recovered by the water from tank 86 as it passes through a condenser such as condenser 84 can be sufficient to meet the demand for service hot water and for water in heating heat exchangers 36 of the various modules.

To ensure the production of sufficient hot water even in the winter, that is, when heating heat exchangers 36 must be operated during the day, it is advantageous to operate the refrigeration apparatus and supply heat to the condensers and consequently to assure a reserve and/or to provide, inside hot water tank 86, auxiliary heating means that, advantageously, can be electric heating coil 102 placed inside hot water tank 86 above baffle 90 and supplied with electrical power by line 256 in a controlled manner.

One can easily understand that the operation of electrical heating coil 102, like that of electrically operated valve 99, is controlled not individually by controllers 38, 39 and 40 of the various modules 5, 6 and 7 but by central controller 103, that is of the type that can easily be provided for the purpose by one skilled in the art, and which also provide to controllers 38, 39 and 40, corresponding to the respective modules, certain operating parameters, individually appropriate for the various modules 5, 6 and 7 as a function of the time of day, the priority of one room over another, etc.

The recovery of energy from the different condensers 84, just described, to produce hot water uses a heat exchange liquid, specifically, the water itself, placed in direct heat exchange relationship, in each condenser 84, with the refrigerant flowing between compressor 81 and evaporator 78.

One would not leave the scope of the present invention if one were to substitute the heat exchange between a liquid and the refrigerant by a heat exchange between a gas, notably air, and the refrigerant. In FIGS. 7 and 8, a system is shown where, instead of condensing the refrigerant at different condensers 84 by circulating a liquid, specifically water, the condensation is accomplished by circulating a gas, specifically air, that then reheats the service hot water to supply the heating heat exchangers 36 of the various modules. These heating heat exchangers 36 were described with reference to FIG. 2 as air-to-water heat exchangers but can, as here, be advantageously replaced by air-to-air heat exchangers.

Figure 8:
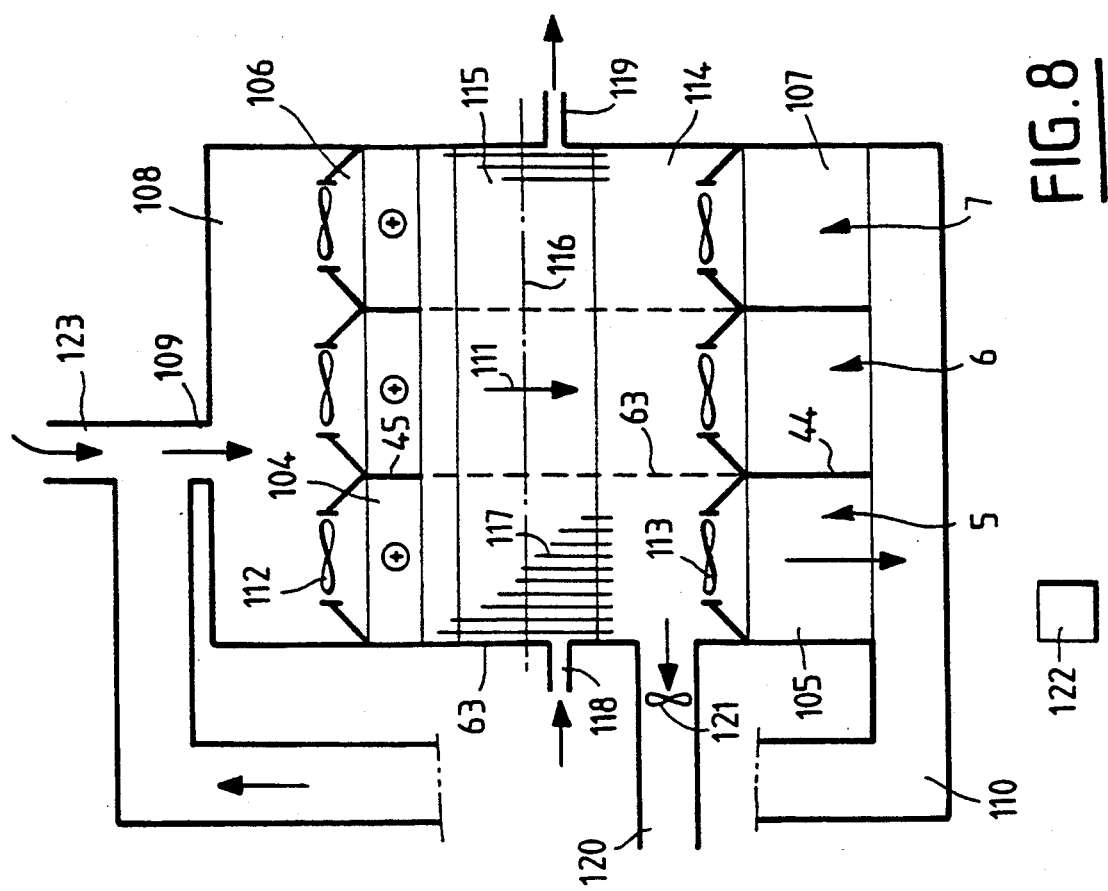
FIGS. 7 and 8 show, in a view similar to those of FIGS. and 6, another example of the energy recovery means.
Figure 7:
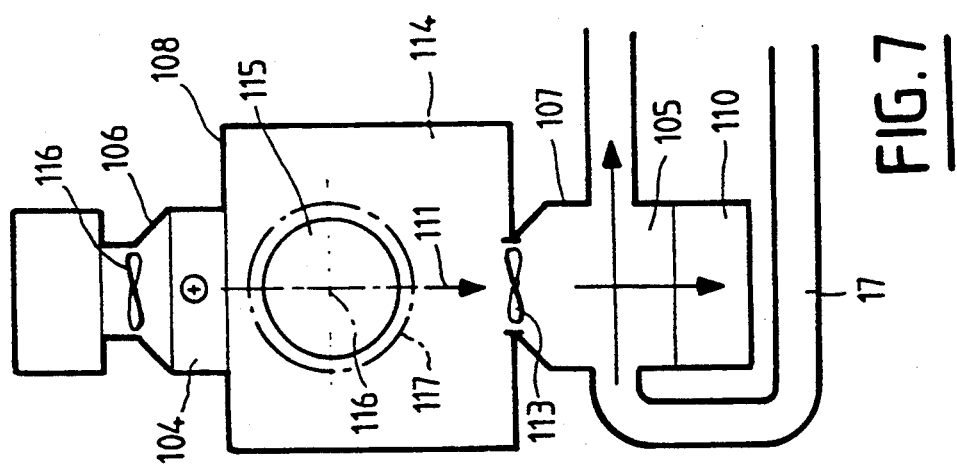

FIGS. 7 and 8 illustrate such a mode of recovery of energy by heat exchange between the air and the refrigerant in condensers such as condenser 104 replacing, at each of modules 5, 6 and 7, the respective condenser such as condenser 84 and with heat exchange between the same air and the air circulating in internal flow path 17 of subassemblies, such as subassembly 18, of the different modules 5, 6 and 7 in air-to-air heat exchangers such as heat exchanger 105 replacing, in each module, the corresponding heating heat exchanger such as heat exchanger 36.

Condensers such as condenser 104 are then arranged in a subassembly such as subassembly 35 of the various modules 5, 6 and 7 in a manner to permit positioning lateral sides 45 of the subassemblies next to each other. Air-to-air heat exchangers, such as exchanger 105, taking the place of a heating heat exchanger are then placed, in subassemblies such as subassembly 18, so that lateral sides 44 are next to each other and so as to form suite 106 of condensers such as condenser 104 and suite 107 of air-to-air heat exchangers such as heat exchanger 105, which are respectively aligned parallel to the positions of modules 5, 6 and 7.

Housing 108, shared by modules 5, 6 and 7, encloses suites 106 and 107 and defines an air flow path that, from inlet duct 109 of housing 108 towards outlet duct 110 of the housing, successively passes through suite 106 of condensers such as condenser 104 and suite 107 of air-to-air heat exchangers such as heat exchanger 105, in direction 111.

Immediately downstream from each condenser such as condenser 104 and immediately upstream from each air-to-air heat exchanger such as heat exchanger 105, with reference to direction 111 and inside housing 108 is located an electrically driven fan, such as fan 112 or fan 113, supplied with electric power by line 236 and controlled by a controller such as controller 38 of a module such as module 5.

In addition, service hot water tank 115 is located in space 114 of housing 108 between suites 106 and 108. Tank 115 is cylindrical, has axis 116 that is parallel to the alignment of modules 5, 6 and 7 and has small external fins 117 for exchange of heat with air moving in direction 111 from suite 106 to suite 107. Tank 115 is fitted with service cold water inlet 118 at one end and with service hot water outlet 119 at its other end.

Moreover, exhaust duct 120 opens into space 114 between tank 115 and fans such as fan 113 of air-to-air heat exchangers such as heat exchanger 105. Duct 120 is for hot air and has fan 121, controlled by central controller 122. Controller 122 supplants controller 103 in all of its functions, notably in its function of avoiding overheating in tank 115. Preferably, fan 121 is of the variable speed type.

External to space 114, the air that passes through the space essentially flows through a closed flow path, with outlet duct 110 being joined to inlet duct 109. However, means 123, shown schematically, permits the introduction of fresh air into this closed flow path, which fresh air is conveyed by duct 43, with reference to FIG. 1, or by air drawn from the rooms to be air conditioned to be exhausted to the outside, passing through a duct similar to the one in which heat exchanger 96 is located, with reference to FIG. 6.

The operation of the energy recovery device illustrated in FIGS. 7 and 8 is easily understood. When compressors such as compressor 81 are operating, particularly to accumulate cooling capacity in corresponding reservoir 69, the air that passes through condensers such as condenser 104, by condensing the refrigerant of the different compressors such as compressor 81, becomes heated, a part of which heat it loses by contact with small fins 117 of hot water tank 195, reheating the water in this tank. Depending on whether there is a simultaneous need for heating the air from one of rooms 1, 2 or 3, the hot air can still pass through the corresponding air-to-air heat exchanger such as heat exchanger 195, driven by a corresponding fan such as fan 113, to reheat the air circulating in the internal flow path, such as is designated by 17 of corresponding module 5, 6 or 7 before reaching outlet duct 110 where it returns to inlet duct 109, or before it is exhausted through exhaust duct 120 by fan 12. When compressors such as compressor 81 are not operating and, possibly, a need for heat arises at one or the other of air-to-air heat exchangers such as heat exchanger 105, the temperature can be regulated by a corresponding fan such as fan 113, as determined by corresponding controllers 38, 39 or 40, to cause a flow of air in direction 111 inside space 114 and to recover, by means of this air, heat from the hot water in tank 115 and to transfer this heat, in the corresponding air-to-air heat exchanger such as heat exchanger 105, to the air circulating in the internal flow path such as designated by line 17 of corresponding module 5, 6 or 7.

Preferably, like hot water tank 86, hot water tank 115 is fitted with auxiliary heating means, such as an electric heater, that makes up, as required, for insufficient heat contribution from the air passing through space 114.

Naturally, instead of recovering the heat that can be present in condensers such as condenser 84 or condenser 104 during the operation of compressors such as compressor 81, one can also transfer the heat into the atmosphere by direct heat exchange, at each condenser such as condenser 84 or condenser 104, with a fluid that can be discharged directly into the atmosphere, in which case one, of course, would use as this fluid the air drawn from the different rooms 1, 2 or 3 and discharged to the outside in compensation for the fresh air introduced at each module, with the different condensers in that case being in the form of heat exchangers such as condenser 104, placed in the duct that conveys this air or a fluid that is then subjected to heat exchange with the ambient air and, for example, a cooling water that is then conducted to water-to-ambient air heat exchangers. In that case, heating the service hot water and heating the air passing through the internal circuit such as designated by line 17 of each module must be accomplished by different means. In particular, heating heat exchangers such as heat exchangers 36 and 105 of the different modules 5, 6 and 7 described above could be advantageously replaced by electrical resistance heating devices as proposed in the '768 patent. Such electrical resistance heating devices can be advantageously placed at the inlet such as inlet 124 of the various fans such as fan 41.

Figure 3:
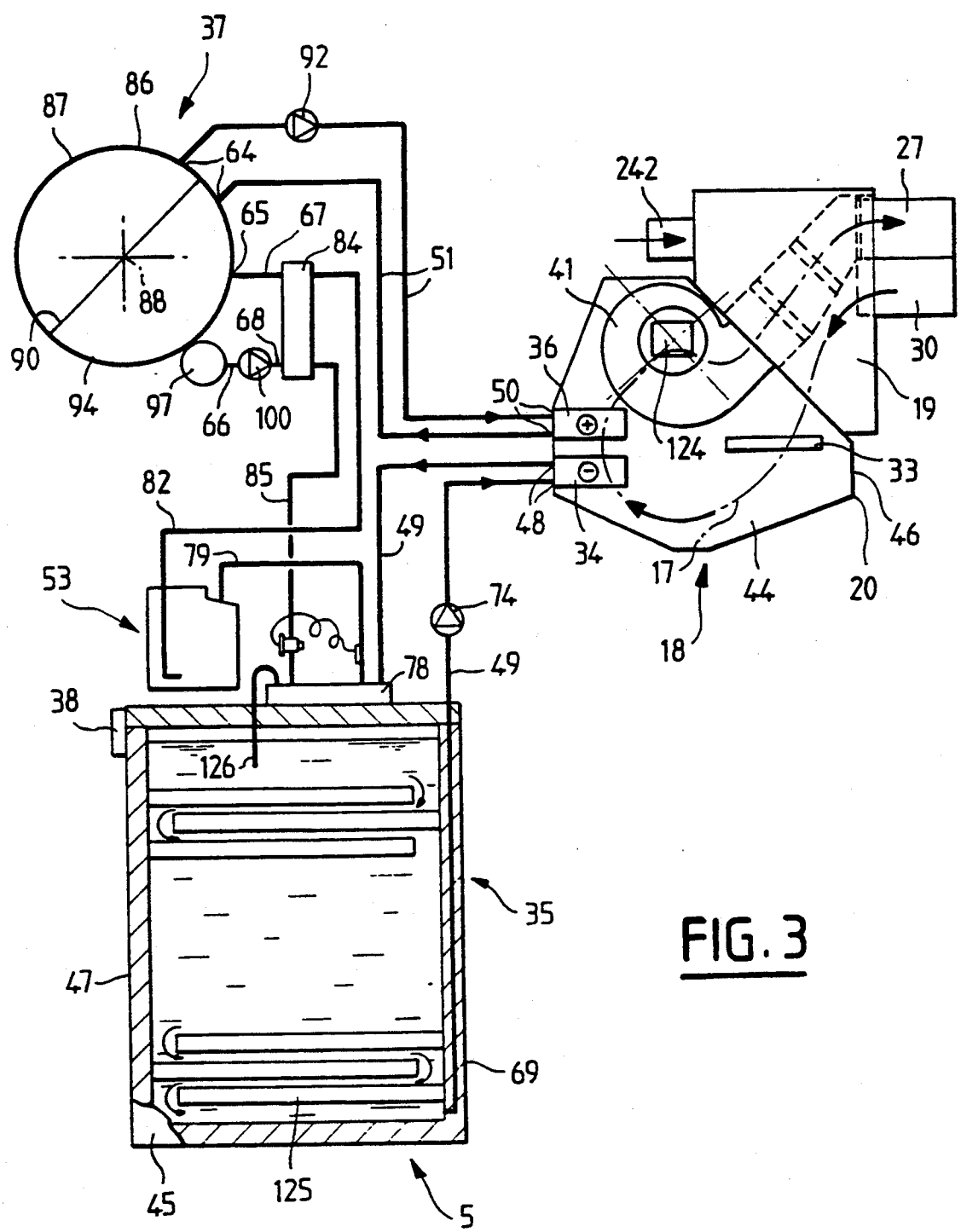
FIG. 3 shows, in an elevation view, partially cross sectioned, a second embodiment of an air conditioning module for the installation illustrated in FIG. 1, also of the preferred type that can be positioned horizontally next to other modules of the same type, with this module occupying its functional position.
Figure 4:
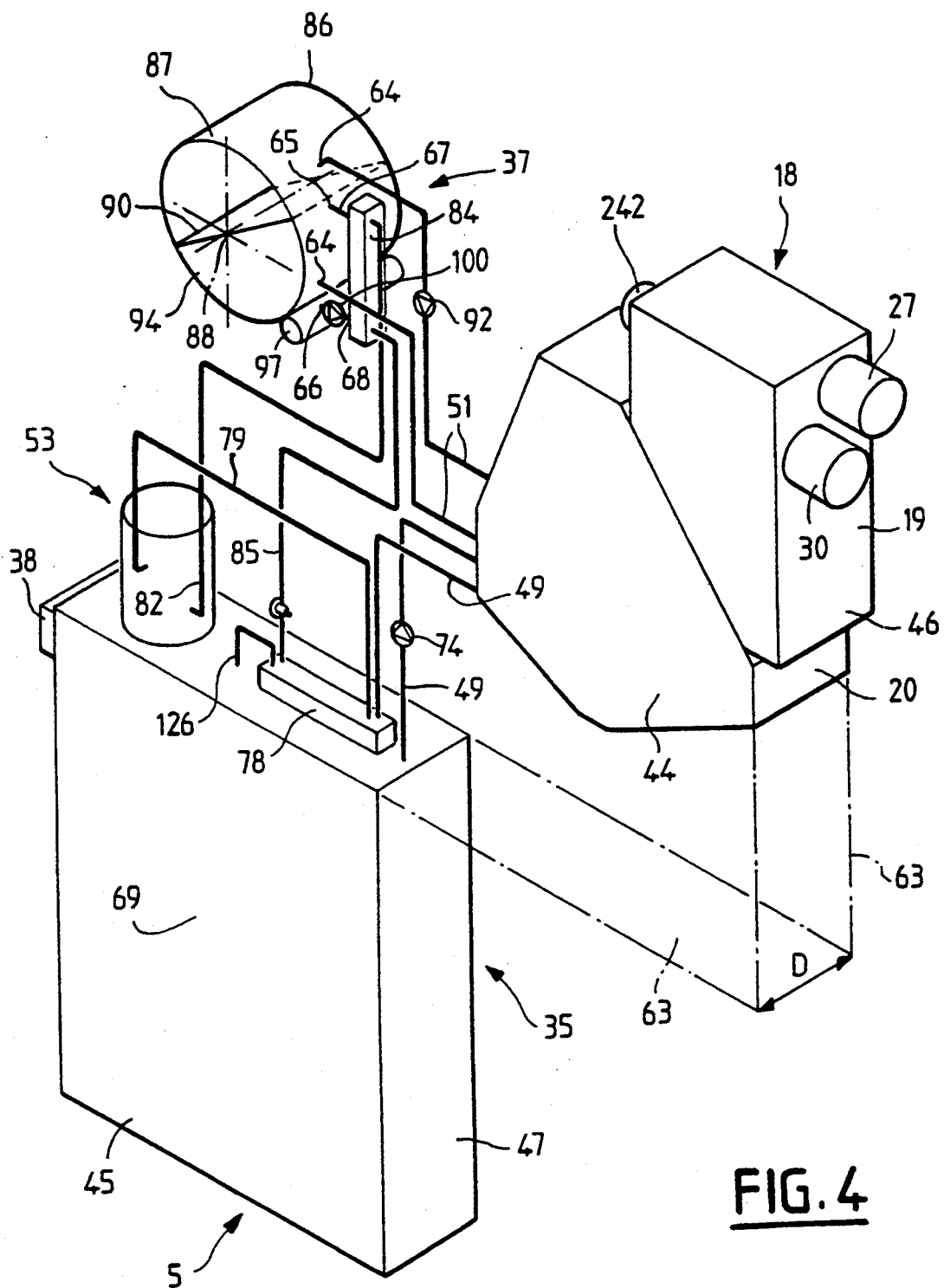
FIG. 4 shows a perspective view of the second embodiment.

Naturally, the process of accumulating and storing cooling capacity just described, like the process of delivering that cooling capacity to cooling heat exchanger 36 of a module such as module 5, are only nonlimiting examples. FIGS. 3 and 4 illustrate an embodiment of a different module 5 compared to the one illustrated in FIG. 2.

However, FIG. 3 and 4 show identical subassemblies 18 and 37 of the module of which only subassembly 35 and the connections between the latter, on the one hand, and the two other subassemblies 18 and 37, on the other hand, are modified in comparison to the description made with reference to FIG. 2.

Similarly, refrigeration apparatus 53 and its connections with subassembly 37, on the one hand, and the connections between subassemblies 37 and 18, on the other hand, are preserved identically, it being understood that subassembly 37 could be replaced by the device illustrated in FIGS. 7 and 8 and by means for direct or indirect exhaust into the atmosphere of the heat transferred in condensers such as condenser 84 of the different refrigeration apparatus such as apparatus 53 as described above.

In this embodiment, reservoir 69 does not directly contain water to be frozen as is the case in the embodiment described with reference to FIG. 2, but an antifreeze liquid such as glycolated water intended to supply cooling heat exchanger 36 of subassembly 18. Inside reservoir 69, this antifreeze liquid bathes ice storage flasks 125, arranged so as to form baffles for the antifreeze fluid and extending from the top to the bottom of reservoir 69. The configuration of such ice storage flasks is known and requires no further description.

The antifreeze liquid in this case is drawn from a lower section of reservoir 69 through a portion of pipe 49 leading to cooling heat exchanger 36 by pump 74, while another portion of pipe 49 is connected directly to evaporator 78 in which the antifreeze liquid from cooling heat exchanger 36 is placed in heat exchange relationship with the refrigerant in refrigeration apparatus 53 before being returned to an upper section of reservoir 69 through outlet pipe 126 of evaporator 78.

In such a case, evaporator 78 could be placed inside reservoir 69 and immersed in the antifreeze liquid, in which case pipe 126 would be unnecessary.

Naturally, the module shown in FIGS. 3 and 4 preferably preserves the flat lateral sides of the different subassemblies and the absence, on those lateral sides, of components to which access must be provided to accomplish maintenance, as shown in FIG. 4, as well as to maintain the ability to remove at least subassemblies 18 and 35 from a row of such subassemblies positioned next to each other by moving those components only in directions parallel to the lateral sides.

The operation of module 5 illustrated in FIGS. 3 and 4 is as follows.

When room 3 does not require air conditioning, with fan stopped, as, for example, at night, the simultaneous operation of compressor 81 and pump 74, under the control of controller 38, causes a circulation of the antifreeze liquid through reservoir 69, cooling heat exchanger 36 and evaporator 78, cooling the water in ice storage flasks 125 as it flows.

When the module must be operated to cool room 3, fan 71 is started, compressor 81 is stopped and pump 74, controlled by controller 38, causes a circulation of antifreeze liquid between reservoir 69 and cooling heat exchanger 36, with gradual removal from the reservoir of the cooling capacity stored in the ice in flasks 125. If the depletion of cooling capacity becomes excessive, which is observed by the temperature sensors, compressor 81 can be started to supply the necessary cooling capacity in cooling heat exchanger 36.

The operation of the module to heat room 3 can be identical to that of the module described with reference to FIG. 2.

Figure 9:
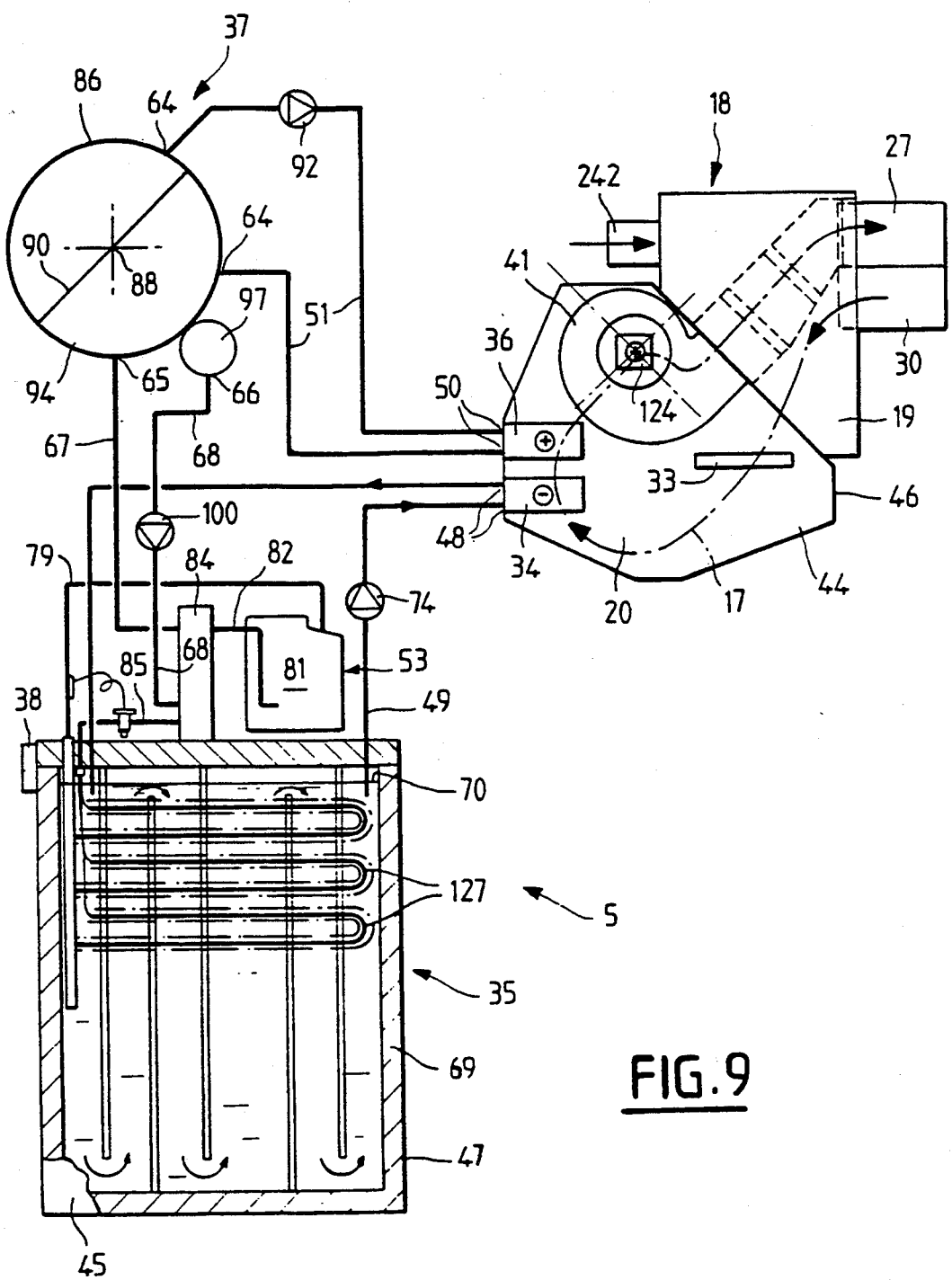
FIG. 9 shows, in a view similar to that of FIG. 3, a third embodiment of an air conditioning module that can be part of an system of the type illustrated in FIG. 1, with this air conditioning module being of the preferred type that can be positioned horizontally next to other modules of the same type to form the system, occupying its functional position.

Referring now to FIG. 9, module 5 is identical to those described with reference to FIGS. 2, 3 and 4 and is capable of the same variant embodiments, particularly with respect to the manner in which the heat present in condenser 84 of refrigeration apparatus 53, is taken up for recovery or exhaust but differs from those in the manner in which the cooling capacity in reservoir 69 is stored and removed.

As in the embodiment described with reference to FIGS. 3 and 4, this reservoir 69 directly contains a liquid, such as water, for freezing. As needed, pump 74, causes a flow of the liquid through one section of pipe 49 to cooling heat exchanger 34 and another section of pipe 49 returns the liquid to reservoir 69. However, refrigeration apparatus 53 contains immersed tubular evaporator 26 and the liquid from cooling heat exchanger 34 is returned directly into reservoir 69 through pipe 49 without passing through an evaporator as described with respect to the other embodiments and without exchanging heat with the refrigerant in such an evaporator.

More precisely, condenser 84 is connected by pipe 85, that has an expansion device, to immersed tubular evaporator 127. Evaporator 127 extends over the height of reservoir 69 and is connected in parallel between pipe 85 and pipe 79 for return to the suction inlet, not shown, of compressor 81. In this case, ice forms directly around the coils of evaporator 127, whose contents are still in the liquid phase, by localized freezing of the liquid. The ice thus formed is immersed in the fluid and reservoir 69 does not contain ice storage flasks such as the flasks 125 described with reference to FIG. 3.

One skilled in the art can easily deduce the mode of operation of the module illustrated in FIG. 9 from the mode of operation of the module illustrated in FIGS. 3 and 4.

The three embodiments of a module according to the invention that have just been described with reference to FIGS. 2, 3, 4 and 5, respectively, use a liquid to transfer heat between the ice stored inside a reservoir such as reservoir 69 and air flowing along a path as designated by line 17 through a subassembly such as subassembly 18 of a module such as module 5.

Figure 14:
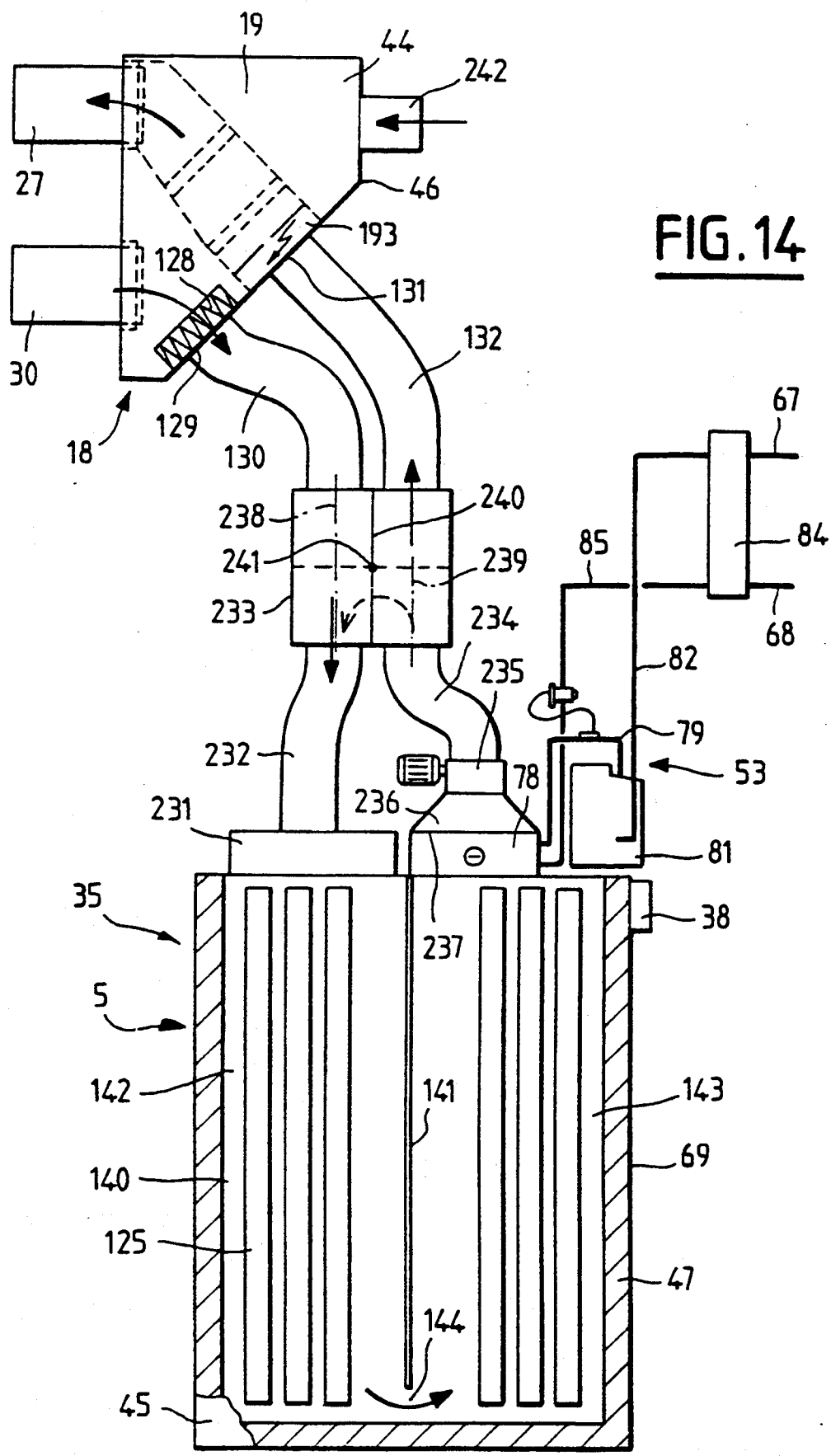
FIG. 14 shows, in a view similar to those of FIGS. 3, 9, and 10, a sixth embodiment of an air conditioning module, that can be part of a system of the type illustrated in FIG. 1, with this module being of the preferred type that can be positioned horizontally next to other modules of the same type, occupying its functional position.

FIGS. 10 through 14 show several modules in which no antifreeze or freezable liquid is provided. FIGS. 10 and 11 through 13 are embodiments where air flowing through a closed loop is used as an intermediate heat transfer fluid for heat exchange between freezable water or ice stored in the reservoir and the air to be supplied to a room as well as to make ice in the reservoir. FIG. 14 show an embodiment where the air to be supplied to a room is placed in direct heat exchange relationship with freezable water or ice in the reservoir and the air is alternately used to make ice or to extract from the ice cooling capacity to be supplied to the room.

Figure 10:
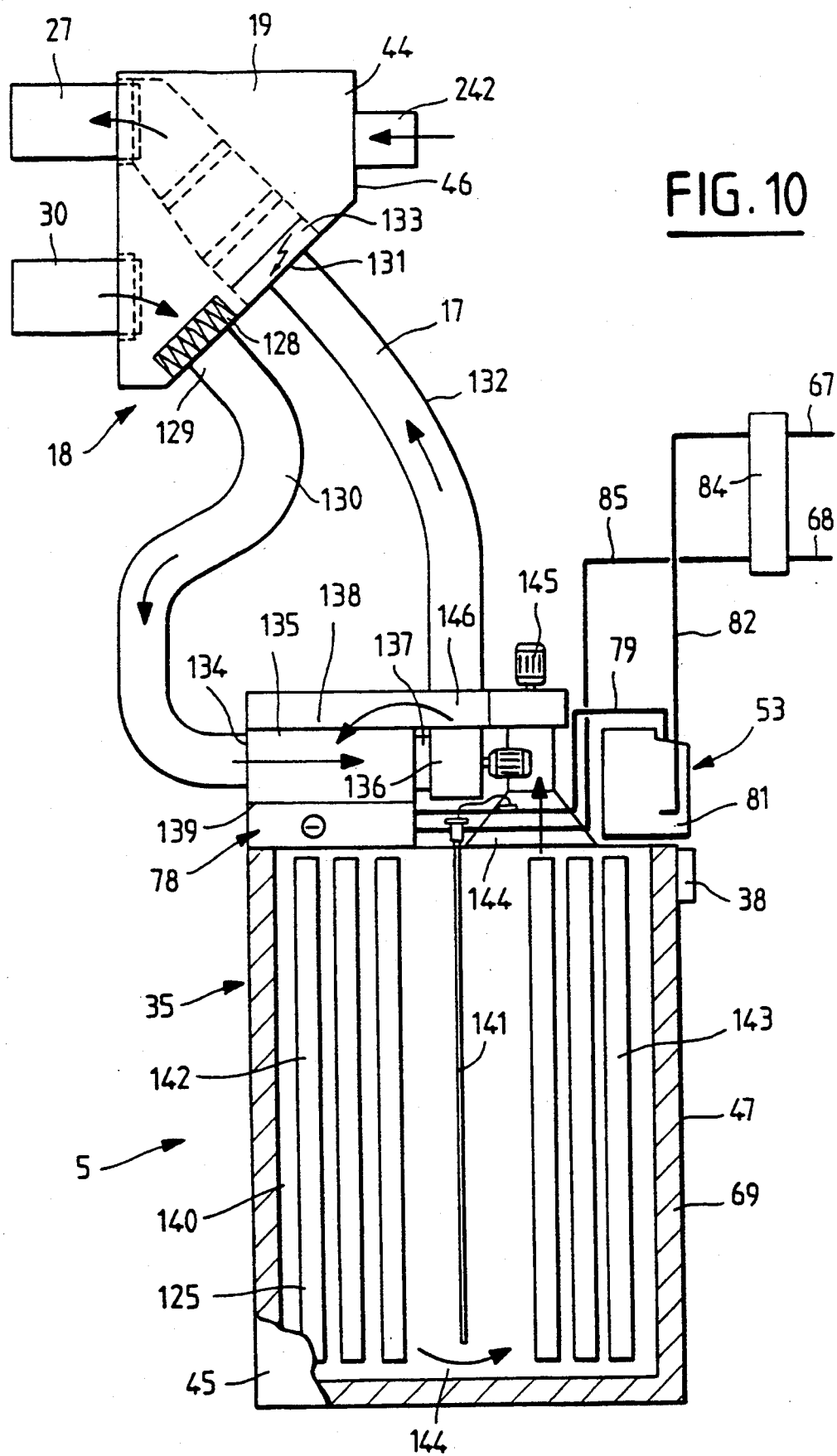
FIG. 10 shows a fourth embodiment of an air conditioning module, in a view similar to that of FIG. 3 and 9.

FIG. 10 shows module 5 that comprises two subassemblies 18 and 35, respectively suspended from a ceiling and supported on a floor and possibly comprising a subassembly similar to subassembly 37, shared by the different modules grouped in the same mechanical room, in a manner not shown, but easily deduced by one skilled in the art from the description of FIGS. 1 through 9.

Subassembly 18 in this case is casing 19, having connectors 27, 30 and 242, described above, respectively for returning air to room 3, the suction of air from that room, and the introduction of fresh air. However, in contrast to casing 19 described with reference to FIG. 2 and the similar casings described in the '768 patent, this casing 19 has, in the FIG. 10 embodiment, filter 128 in the flow path followed by the air drawn from the room located between connector 30 and connector 129. Duct 130 joins connector 129 with the origin of the flow path, designated by line 17 in FIG. 2, in air conditioning enclosure 20. Connector 129 is an airtight connection for duct 130 in the module illustrated in FIG. 10. Duct 132, for return air flow to room 3, joins connector 131 with the end of the internal flow path designated by line 17 in FIG. 2. Connector 131 is an airtight connection for duct 130 in the module shown in FIG. 10. In addition, located in casing 19, in the case of FIG. 10, is heating heat exchanger 133 that preferably is an electric resistance heater, supplied with electrical power from line 256 and controlled by controller 38. Heat exchanger 133 could also heat the air by direct heat exchange with hot water possibly supplied by subassembly 37. Ducts 130 and 132, like connectors 129 and 131 located between the coplanar geometrical extensions of lateral sides 44 of casing 19 and lateral sides 45 of subassembly 35 to preserve the ability of positioning several modules next to each other without impeding access to components that may require maintenance and to permit the removal of a module by movements that are exclusively parallel to lateral sides 44 and 45 and to the coplanar geometrical extensions of those sides.

In an upper zone of subassembly 35, duct 130, which conveys air exhausted from room 3, is connected to inlet 134 of the secondary circuit, not shown, of air-to-air heat exchanger 135 while duct 132, which returns air to room 3, is connected to outlet 137 of the secondary circuit of heat exchanger 135. Electric fan 136, supplied with electrical power from line 256 as controlled by controller 38 draws air from duct 130, through heat exchanger 135 and discharges the air into duct 132.

The secondary circuit of air-to-air heat exchanger 135 is horizontal in the example shown while the primary circuit is vertical.

Given this orientation, the primary circuit of heat exchanger 135 has, at its top, inlet 138 and, at its bottom, outlet 139. It is positioned immediately above evaporator 78 of refrigeration apparatus 53 that is also located in the upper part of subassembly 35. The heat present in condenser 84 can be possibly recovered in subassembly 37, not shown, or discharged into the atmosphere.

The air passing through the primary circuit of heat exchanger 135 from inlet 138 to outlet 139, that is, from top to bottom, under the urging of means that will be described below, also passes through direct expansion evaporator 78 from the top to the bottom to reach the interior of reservoir 69, whose exterior configuration is the same, but whose interior design differs from the reservoirs 69 described above.

As is the case in reservoir 69 described with reference to FIG. 3, freezable water or, depending on the temperature, ice, is maintained inside sealed flasks 125 distributed in the interior of reservoir 69, but this time in a vertical position so as to define, between themselves and the walls of reservoir 69, vertical passages 140 for air, with those passages being in communication with each other in a lower section of reservoir 69.

Both flasks 125 and passages 140, have a general perpendicular orientation with respect to lateral sides 45 of reservoir 69. The interior of reservoir 69 is watertightly subdivided by baffle 141, which is also vertical and perpendicular to lateral sides 45, into two halves 142 and 143 that are not in communication with each other except through passage 144 located in a lower section of the reservoir to ensure that in this zone there is communication between air passages 140 respectively located in one of halves 142 and 143.

Only half 142 communicates with outlet 139 of the primary circuit of heat exchanger 135 with an intermediate passage through direct expansion evaporator 78 so that the air, having passed through the evaporator, flows through passages 140 of half 142 of reservoir 69 from top to bottom, then through passage 144 into passages 140 located in half 143 of reservoir 69.

Electric fan 145, supplied with electric power by line 265 as directed by controller 38, takes a suction from the top of half 143 of reservoir 69 through suction inlet 144 and discharges through header 146 into inlet 138 of the primary air flow path through air-to-air heat exchanger 135.

One skilled in the art will readily understand that, in a manner determined by controller 38:
  one can run fan 145 at the same time as compressor 81 in order make ice inside flasks 125 of reservoir 69 while fan 136 is stopped, or, on the contrary, while fan 136 is operating to cool air drawn from room 3, with the addition of fresh air, and then return the conditioned air to room 3;
  while compressor 81 and fan 145 are not running, one can cause, by means of fan 136, a suction from and a return of air to room 3 with heating of this air, if needed, and with the addition of fresh air, as the air passes through heating heat exchanger 133; and
  by running fans 136 and 145 without energizing heating heat exchanger 133, one can exhaust air from room 3, then return it after having added fresh cooled air by using the cooling capacity of the ice stored in flasks 125, while compressor 81 is not running, it being understood that compressor 81 can be started if the temperature sensors sense that the cooling capacity of flasks 125 is insufficient to meet demand, as a function of the desired temperature in room 3.

In a variant embodiment of the interior of reservoir 69, air passageways 140 and ice storage flasks 125 could be replaced by heat exchanger tube banks, used for the circulation of air moved by fan 145, and by sealed spaces, defined by these tube banks, that contain freezable water or the ice, as is described with reference to FIG. 7 of French Patent Application No. 92 03831 (the '381 application) filed on the same date as the application for the present invention in the name of the company Carrier S.A. The teachings of that application, in this respect, must be considered to be incorporated in this description.

Figure 11:
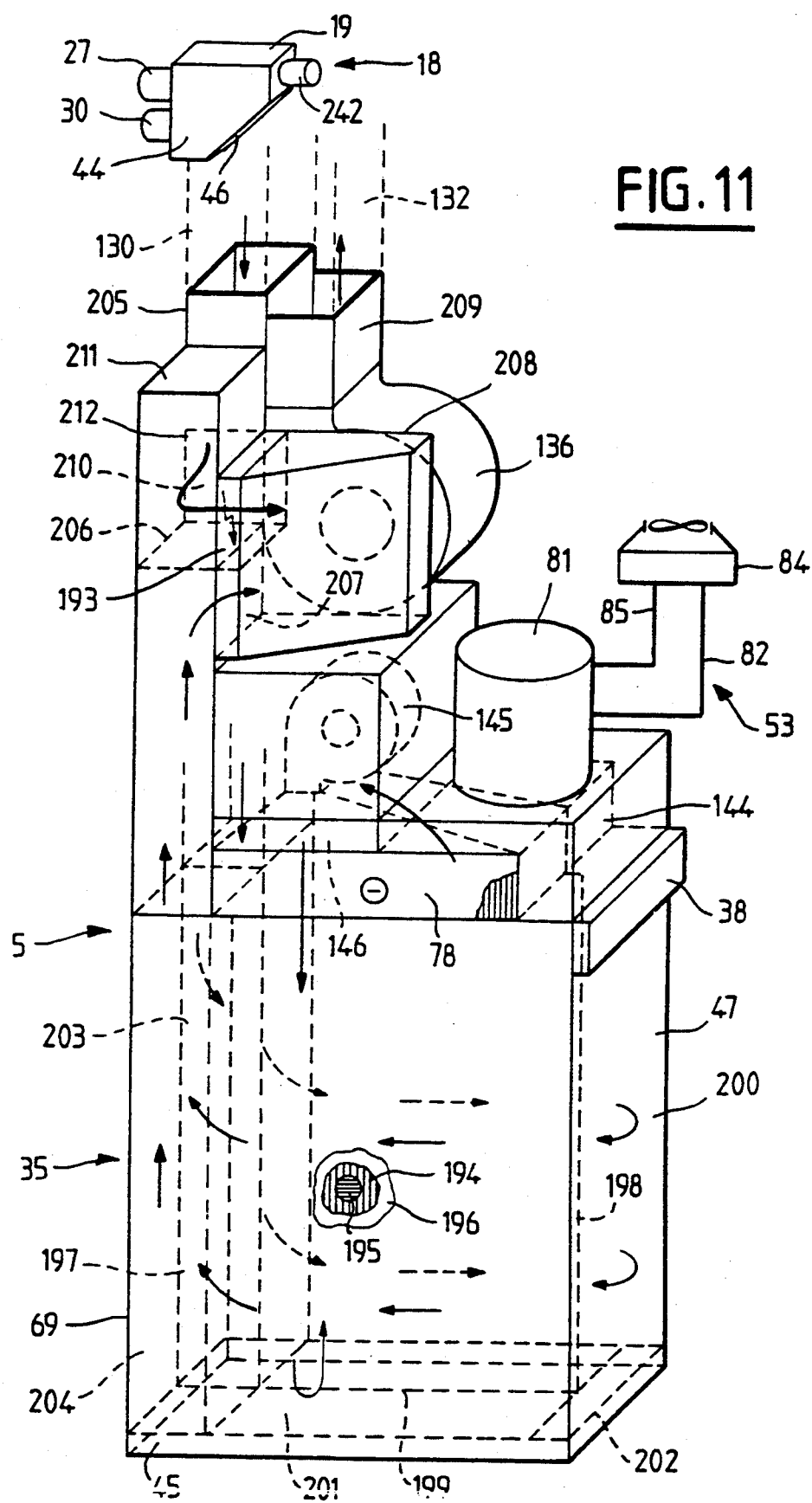
FIG. 11 illustrates, in a perspective view, two variations of a fifth embodiment of an air conditioning module that can be part of a system of the type illustrated in FIG. 1, with this module being of the preferred type that can be positioned horizontally next to other identical modules of the same type, occupying its functional position.

Reference is now made to FIG. 11, that shows a module 5 that differs from the module 5 described above notably in the fact that it does not have the same separation of subassemblies 18 and 35.

Subassembly 35 can in this case be associated or not with subassembly 37 for hot water production, depending on whether one wishes to recover, to heat service hot water, the heat released in condenser 84 of refrigeration apparatus 53, which is also used in this embodiment.

In addition, subassembly 35 can be associated with subassembly 18, limited to casing 19 described with reference to FIG. 2, that is, with no heating heat exchanger in contrast to the description made with reference to FIG. 10, with filter 128, however, preferably being retained.

However, subassembly 35 is connected to casing 19, as described with reference to FIG. 10, by ducts 130 and 132 that carry air coming from room 3 to be conditioned, fresh air added and returned to room 3 after it has been heated by module 5 to the desired temperature.

In this embodiment, reservoir 69 is again used, but it contains means for defining not only spaces for ice and water storage, but also flow paths for primary air, used to make ice in the circumstances described with reference to FIG. 10, and for secondary air, in practice the air drawn from room 3, possibly with the addition of fresh air, which is then returned to room 3.

For this purpose, it is also advantageous to provide, inside reservoir 69, any one of the devices for transferring heat between the water or ice, the air intended to freeze the water and the air intended to use the cooling capacity that has been stored in the form of ice as described with reference to FIGS. 3 and 8 of the '831 application, with the addition of appropriate collecting means whose design is within the normal abilities of one skilled in the art.

As a nonlimiting example, FIG. 11 illustrates the use of, inside reservoir 69, the means described with reference to FIG. 3 of the '831 patent application, ensuring a counterflow for the primary air and the secondary air in tube banks vertical 194 and horizontal 195, respectively, combined in flat groups that delimit between them spaces 196 for ice storage and in which horizontal tubes 195 are generally held in a sandwich pattern between vertical tubes 194. These tube banks or groups of banks are oriented parallel to lateral sides 45 of reservoir 69. Half are distributed, like spaces 196, respectively on each side of watertight baffle 197 oriented parallel to lateral sides 45, watertightly joined to the wall of reservoir 69 in a part of this wall in which peripheral side 47 is vertical and directed like connections 27 and 30 of casing 19, while baffle 197 presents on the opposite side, and toward the bottom, vertical borehole 198 and horizontal borehole 199 separated from the wall of reservoir 69 so as to free passage 200 for communication between horizontal tubes 195 placed respectively on both sides of baffle 197 and intended for the passage of the secondary air, as well as passage 201 for communication between vertical tubes 194 and baffle 197, and intended for the passage of the primary air. Watertight horizontal wall 202, watertightly joined to borehole 199 of baffle 197 as well as, at all sites, to the walls of reservoir 69 both watertightly separates passages 200 and 201 and also separates passage 201 and two air risers 203 and 204. These risers are themselves separated from each other by baffle 197 and placed on both sides of baffle 197 between the walls of reservoir 69 and separate tube banks 194 and 195 from ice storage spaces 196 opposite borehole 198 of baffle 197. Horizontal tube bank 195 opens into one of risers 203 or 294 located on same side as baffle 197 where they define, within reservoir 69, together with risers 203 and 204 a secondary air flow path. Vertical tube banks 194, located respectively on each side of baffle 197 themselves define, inside reservoir 69, together with passage 201, a primary air flow path that does not communicate with the secondary air flow path.

The primary air flow path is completed, immediately above the reservoir, in the manner described with reference to FIG. 10, by evaporator 78 of refrigeration apparatus 53 on one side of baffle 197 and, on its other side, by suction header 144 of primary fan 145, whose return header 146 in contrast opens directly into evaporator 78.

Riser 203 supplies, into horizontal tube banks 195, both air drawn from room 3, which is served by module 5, and fresh air. For this purpose, it extends vertically above reservoir 69 to connector 105 for joining to duct 130.

Riser 204 also extends vertically above reservoir 69 and more precisely to a level that is slightly higher than that of fan 145, at which level it is airtightly closed by horizontal wall 206. But it has, between wall 206 and the level of fan 145, passage 207 connecting with suction header 208 of fan 136. The discharge of fan 136 has the form of connector 209 for joining to duct 132, which is positioned next to connector 205. Fan 136 and suction header 208 are located directly above fan 145.

Passage 210 also opens into header 208 immediately above passage 207 and contains heating heat exchanger 193, which is advantageously electric although a water-to-air heat exchanger can also be provided. Passage 210 is separated from riser 204 and passage 207 by wall 206 and is in permanent communication with riser 203 through extension 211 of riser 204 at its top, with extension 211 being in the form of an airtight box closed with the exception of passage 210 and passage 212, that communicates with riser 203 immediately below connector 205.

There are means for opening passage 210 and closing passage 207 when the air supplied to room 3 must be heated. This heating is accomplished by passing this air through heat exchanger 193, supplied with heat as controlled by controller 38, and for closing passage 210 and opening passage 207 when this air must be cooled. The cooling is accomplished by circulating the air through reservoir 69, in heat exchange relationship with the primary air in tube banks 194, which in turn is in heat exchange relationship with ice located in space 196 and, possibly, if the cooling capacity of the stored ice is not sufficient to meet demand, by running the compressor.

An example of a device that allows the opening of one of passages 207 and 210 and closing the other alternately according to the needs in room 3 served by module 5 is shown in FIGS. 12 and 13 where one can see that passages 207 and 210 are provided, in flat, vertical wall 213 of riser 204 and its extension with a number of identical horizontal slits distributed both below wall 206 and above it. Flat, vertical register 214 is located against vertical wall 216 and mounted in a vertical sliding installation that straddles wall 206 and has below it slits 215 that are identical to the slits defining passage 207 and placed with respect to each other in a manner identical to the above so that, by appropriate sliding of register 214 against wall 213, one can bring slits 215 into register with the slits defining passage 207. Similarly, above wall 206, register 214 has slits 216 that are identical to the slits defining passage 210 and are arranged identical to the latter so that, by sliding register 214 along wall 213, one can bring slits 216 into register with the slits forming passage 210. However, the group formed by slits 216 has, compared to the group formed by slits 215, a different positioning, in the vertical direction, from the group defined by the slits of passage 210 with respect to the slits defining passage 207 on wall 213 so that, as shown in FIGS. 12 and 13, an overlapping positioning of slits 215 with the slits defining passage 207 is accompanied by a vertical shift of slits 216 with respect to the slits defining passage 210, with the latter being closed by register 214, and conversely, as shown in FIG. 13.

Means 217 moves register 214 between the position where slits 215 are in register with the slits defining passage 207 and the position where slits 216 are in register with the slits defining passage 210.

Means 217 can be controlled by controller 38 depending on whether room 3 is being heated or cooled. Means 217 can be in the form of an electromagnetic [solenoid]. Means 217 can also be in the form of means for maintaining register 214 in a position so as to open passage 207 as long as heating heat exchanger 193 is not energized and, upon detection of the actuation of exchanger 193, as signaled by controller 38, that is, when the resulting heat is detected, causing the movement of register 214, during periods of heating, to a position so as to open passage 210. Such means are illustrated in FIGS. 12 and 13 in the form of actuator 218, containing a highly thermoexpansive substance that causes the movement of vertical pushrod 219. Pushrod 219 acts on register 214, sliding it upward and closing passage 207 and opening passage 210, through the action of spring means 220. Means 217 also has spring means 230 for the return of register 214 downwards, that is, to a position so that passage 210 is closed and passage 207 is open and which corresponds to the retraction of pushrod 219 into actuator 218 when the heating heat exchanger is not operating. Such an apparatus is known to one skilled in the art and does not require further description.

Although the use of the tube bank of the type described with reference to FIG. 3 of the '831 application was described, with reference to FIG. 11, as a means for heat exchange between the primary air, freezable water or ice and the secondary air, one skilled in the art could easily, without leaving the scope of the invention, adopt for this purpose the means for thermal exchange described with reference to FIG. 8 of the '831 application, or some other means for thermal exchange.

The air conditioning modules, which have just been described with reference to FIGS. 10 and 11 through 13, require the installation, both above the reservoir 69 and inside it, of a primary air flow path and a secondary air flow path that are not in communication with each other.

The air conditioning module 5 illustrated in FIG. 14 allows one to avoid the resulting complications.

This module 5 also presents great similarities with the one described with reference to FIG. 10, in the sense that it comprises subassembly 18 in the form described with reference to the figure, that is, comprising filter 128 and heating heat exchanger 193, at the level of passage 129 for connecting with duct 130 and at passage 131 for connection with conduit 132. It can also comprise subassembly 37 or not comprise such a subassembly, depending on whether one wishes to recover the heat released in condenser 84 of refrigeration apparatus 53, which is also used in this embodiment.

Reservoir 69 that is a part of the composition of subassembly 35 has the same configuration that was described with reference to FIG. 10. One can find in it, in particular, baffle 141, that clears passage 144, ice storage flasks 125 and air passages 140, distributed in both halves 142 and 143 defined by baffle 141 inside reservoir 69. As described with reference to FIG. 10, the positioning of passages 140 and of ice storage flasks 125 could be replaced, respectively on both sides of baffle 141, by devices of the type illustrated in FIG. 7 of the '831 application, filed on the same date as the present application in the name of Carrier S.A.

Towards the top of reservoir 69, half 142 is connected to header 231 for the admission of air into which opens duct 232 connected to duct 130 by distribution device 233, controlled by controller 38, which will be described below.

Distributor 233 connects duct 132 to duct 234 that itself is connected to suction 235 of electric fan 236, supplied with power from line 256 as controlled by controller 38, and that also has suction header 237 opening at the top of half 143 of reservoir 69 through evaporator 78 of refrigeration apparatus 53.

Distributor 233 presents the general form of a housing into which duct 232 opens facing duct 130, along predetermined alignment 238 and in which duct 234 opens opposite duct 132, along alignment 239, which is parallel to alignment 238. Damper 240, mounted so that it can rotate inside distributor 233 about axis 241, is located between the two alignments 238 and 239 and can be positioned, as controlled by controller 38, either in the orientation illustrated by full lines in FIG. 14, in which it allows air flow communication between ducts 130 and 232 and flow communication between ducts 132 and 234 by separating the two ducts 130 and 232 from the two ducts 132 and 234, or in the orientation illustrated by dotted lines in FIG. 14, in which it allows air flow communication between ducts 130 and 132 that is separate from the flow in ducts 232 and 234, which ducts, in contrast, it places in communication. The first of these orientations corresponds to a period when the air supplied to room 3 is cooled, with the air removed from the room, with fresh air added, flows through a path that, from connector 30 to connector 27, causes the air to pass through in succession filter 128, duct 130, duct 232, and half 142 plus half 143 of reservoir 69 where there is direct exchange of heat with the ice stored in flasks 125. In this mode, fan 236, duct 234, duct 132 and heating heat exchanger 193 are not in use. Compressor 81 is then stopped but it can be started, as directed controller 38, so as to cool the air as the air passes through evaporator 78 if the cooling capacity of the ice in flasks 125 is insufficient to meet demand.

The second damper position closes off a part of the air flow path described above and traps a certain quantity of the air. The trapped air moves in a closed flow loop, urged by fan 236, as controlled by controller 38, through distributor 233, duct 232 and halves 142 and 143, reservoir 69, evaporator 78, fan 236 and duct 234. The trapped air freezes the water inside flasks 125 to reconstitute the stored cooling capacity. For this purpose, compressor 81 is operated so that, at evaporator 78, heat is transferred between the refrigerant of refrigeration apparatus 53 and the trapped air. This damper position is also used when heating room 3 with module 5 because it separates the closed flow path formed in this manner from another flow path that, from connector 30 to connector 27, causes air removed from room 3, with fresh air added, to flow in a path successively passing through filter 128, duct 130, duct 132 and heating heat exchanger 193, which is then in operation. This flow path can be accomplished by the fact that air is continuously removed from room 3, in compensation for the introduction of fresh air, by means not shown (notably comprising an exhaust duct in which heat exchanger 96 illustrated in FIG. 6 is located and in which air exhaust occurs through duct 123 in the case of the apparatus shown in FIG. 8). A fan can of course be located in duct 132 to cause a greater flow of air from connection 30 to connector 27.

One skilled in the art will easily understand that the embodiments of the invention that have been described constitute only nonlimiting examples and that in particular, it is possible to create other combinations between the means that have been described as means to make ice from water and the means described for the removal from the reserve of stored cooling capacity to cool air supplied to a room.

We claim:

1. An improved apparatus for ventilating and air conditioning several rooms of the type having a number of modules located in a mechanical room, with each module having
    an air suction connector in air flow communication with a room,
    an air discharge connector in air flow communication with said room,
    an internal air flow path between said air suction connector and said air discharge connector,
    ventilating and air conditioning means through which said internal flow path passes, said ventilating and air conditioning means including means for exchanging heat between air and a cooling medium,
    means for connecting said modules to a source of power and
    means for adjustably controlling the operation of said ventilating and air conditioning means
in which the improvements comprise:
    said cooling medium being water;
    means for storing water being located in each said module; and
    means for freezing water being located in each said module and controlled by said control means.

2. The apparatus of claim 1 in which
    said freezing means is electrical and
    said means for connecting said modules to a source of power comprises means for connecting said modules to a source of electrical power.

3. The apparatus of claim 2 in which each module further comprises electrical heating means disposed in said internal air flow path and controlled by said adjustable control means.

4. The apparatus of claim 1 in which said water freezing means comprise:
   a refrigeration apparatus having an refrigerant evaporator; and
   means for transferring heat between said water and said refrigerant.

5. The apparatus of claim 4 in which said refrigeration apparatus further comprise:
   a refrigerant condenser; and
   means for circulating a cooling fluid in heat exchange relationship with refrigerant in said condenser.

6. The apparatus of claim 5 in which several said modules share said circulating means.

7. The apparatus of claim 5 in which said circulating means further comprise means for transferring heat from said cooling fluid to the atmosphere.

8. The apparatus of claim 7 in which said circulating means consist of an air flow path for exhausting air to the atmosphere.

9. The apparatus of claim 7 in which said circulating means further comprise an air flow path for conditioning air and in which each said module has means, located in said internal air flow path and controlled by said adjustable control means, for direct heat transfer with said air in said conditioning air flow path.

10. The apparatus of claim 5 in which said cooling fluid circulating means further comprise means for recovering energy from said cooling fluid for use in heating.

11. The apparatus of claim 10 in which said circulating means consist of a water flow path.

12. The apparatus of claim 11 in which several said modules share said water flow path.

13. The apparatus of claim 12 in which said water flow path further comprise means for supplemental heating.

14. The apparatus of claim 11 further comprising means, controlled by said adjustable control means, for transferring heat between air in said internal flow path and water in said water flow path.

15. The apparatus of claim 10 in which said circulating means further comprise means for exchange of heat between said cooling fluid and water in said water flow path.

16. The apparatus of claim 4 in which said means for transferring heat between said water cooling medium and said refrigerant is an evaporator placed in direct heat exchange relationship with said water cooling medium.

17. The apparatus of claim 4 in which said means for transferring heat between said water and said refrigerant comprise:
   said evaporator;
   means for transferring heat between a heat transfer fluid and said water cooling medium; and
   a flow path for said heat transfer fluid between said evaporator and said means for transferring heat between said heat transfer fluid and said water cooling medium.

18. The apparatus of claim 17 in which each said module contains a closed flow loop for circulating a heat transfer fluid through
   said evaporator,
   said water cooling medium and
   means for transferring heat between said heat transfer fluid and said air in said internal air flow path.

19. The apparatus of claim 17 in which each said module contains
   a first closed flow loop for circulating a heat transfer fluid through said evaporator and said means for transferring heat between said heat transfer fluid and said water cooling medium and
   a second closed flow loop for circulating said heat transfer fluid through said means for transferring heat between said heat transfer fluid and said air in said internal air flow path.

20. The apparatus of claim 17 in which said heat transfer fluid is a liquid.

21. The apparatus of claim 17 in which said heat transfer fluid is air.

22. The apparatus of claim 17 in which
   said heat transfer fluid is air,
   said heat transfer fluid flow path comprises a portion of said internal air flow path and
   there are means for isolating said portion from said air suction connection and said air discharge connection.

23. The apparatus of claim 1 in which said means for exchanging heat between air and a cooling medium comprise:
   means for transferring heat between a heat transfer fluid and said cooling medium located in said water storage means;
   means for transferring heat between said heat transfer fluid and air located in said internal air flow path; and
   a closed fluid flow loop for circulating said heat transfer fluid between said means for transferring heat between a heat transfer fluid and said cooling medium and said means for transferring heat between said heat transfer fluid and air.

24. The apparatus of claim 1 in which said air in said internal air flow path is in direct heat exchange relationship with said water cooling medium.

25. The apparatus of claim 1 further comprising means for supplying air from the outside atmosphere to said internal flow path.

26. The apparatus of claim 1 each of said modules is identical.

* * * * *

UNITED STATES PATENT AND TRADEMARK OFFICE
CERTIFICATE OF CORRECTION

PATENT NO. : 5,402,844
DATED : April 4, 1995
INVENTOR(S) : Patrice Elluin et al

It is certified that error appears in the above-indentified patent and that said Letters Patent is hereby corrected as shown below:

On the title page, item [73] Assignee should read:

Carrier Corporation, Syracuse, NY
    and Societe d'Administration et de
    Realisations d'Investissements,
    Puteaux, France --

Signed and Sealed this

Seventeenth Day of October, 1995

Attest:

BRUCE LEHMAN

*Attesting Officer*      *Commissioner of Patents and Trademarks*